US006533348B1

(12) United States Patent  
Jaekel et al.

(10) Patent No.: US 6,533,348 B1
(45) Date of Patent: Mar. 18, 2003

(54) MODULAR SPACE FRAME

(75) Inventors: Federico G. Jaekel, Richmond Hill (CA); Gianfranco Gabbianelli, Troy; Frank A. Horton, Rochester Hills, both of MI (US)

(73) Assignee: Cosma International Inc., Concord (CA)

( * ) Notice: Subject to any disclaimer, the term of this patent is extended or adjusted under 35 U.S.C. 154(b) by 0 days.

(21) Appl. No.: 09/556,432

(22) Filed: Sep. 7, 2000

Related U.S. Application Data

(63) Continuation of application No. 09/173,554, filed on Oct. 16, 1998, now Pat. No. 6,092,865.
(60) Provisional application No. 60/062,204, filed on Oct. 16, 1997.

(51) Int. Cl.[7] .................................................. B60J 9/00
(52) U.S. Cl. ..................... 296/205; 296/29; 296/203.04
(58) Field of Search ........................... 296/29, 30, 193, 296/194, 195, 198, 203.01, 203.02, 203.03, 203.04, 204, 205, 209; 52/653.2, 656.9, 735.1, 643.1; 403/270, 571, 272

(56) References Cited

U.S. PATENT DOCUMENTS 1,581,931 A  4/1926  Lamplugh (List continued on next page.)

FOREIGN PATENT DOCUMENTS

DE  867059  1/1953

(List continued on next page.)

OTHER PUBLICATIONS

Lighter Car Body in Aluminum with Hydroforming Technoligy R&D Results, Hanicke et al., IBEC 96, Detroit, Oct. 1–23, Volvo Car Corporation.
International Application No. PCTR/CA 98/00962 PCT Search Report, mailed Jan. 17, 1999, Magna International Inc.

Primary Examiner—Stephen T. Gordon
Assistant Examiner—Lori L Coletta
(74) Attorney, Agent, or Firm—Pillsbury Winthrop LLP

(57) ABSTRACT

A vehicle space frame for constructing a motor vehicle includes a body module and a front module. The body module includes a pair of laterally spaced, longitudinally extending main side rail structures and a pair of rearward-most upright structures each being connected to a respective main side rail structure and extending upwardly therefrom to form a pair of rearward-most pillars thereon. The body module further includes a pair of hydroformed upper longitudinal members each being defined by an outwardly deformed tubular metallic wall fixed in a predetermined irregular exterior surface configuration and each including a pillar-forming portion and a longitudinally extending portion. Each pillar-forming portion is connected to a respective main side rail structure and extends upwardly therefrom to form an A pillar and each longitudinally extending portion is connected at an opposite end portion thereof with an associated one of the, rearward-most pillars, thereby defining, a longitudinal length between the associated A- and rearward-most pillars. A plurality of connecting structures are included in the body module and are constructed and arranged to secure the main side rail structures, the upper longitudinal members, and the pairs of pillars in laterally spaced fixed relation. The front module includes a pair of front lower side rail structures, a pair of front upper side rail structures and front connecting structure. The front connecting structure is constructed and arranged to connect the front lower side rail structures to one another in laterally spaced relation and to connect the front upper side rail structures to one another in laterally spaced relation. The front module is rigidly fixed to the body module by rigidly interconnecting each front lower side rail structure with a respective main side rail structure and each front upper side rail structure to the associated A pillar of a respective hydroformed upper longitudinal member at a position spaced upwardly from the associated main side rail structure.

19 Claims, 5 Drawing Sheets

U.S. PATENT DOCUMENTS

| | | | |
|---|---|---|---|
| 1,846,567 A | 2/1932 | Murray, Jr. | |
| 2,269,451 A | 1/1942 | Ford | 296/28 |
| 2,389,907 A | 11/1945 | Helmuth | 296/28 |
| 2,668,722 A | 2/1954 | Muller | 280/106 |
| 3,159,419 A | 12/1964 | Kerby | 296/28 |
| 3,630,056 A | 12/1971 | Cuq | 72/28 |
| 3,971,588 A | 7/1976 | Bauer | 296/28 |
| 4,355,844 A | 10/1982 | Muzzarelli | 296/205 |
| 4,471,519 A | 9/1984 | Capello et al. | 29/460 |
| 4,618,163 A | 10/1986 | Hasler et al. | 280/785 |
| 4,648,206 A | 3/1987 | Baldamus et al. | 49/502 |
| 4,660,345 A | 4/1987 | Browning | 405/648 |
| 4,726,166 A | 2/1988 | DeRees | 52/694 |
| 4,735,355 A | 4/1988 | Browning | 228/189 |
| 4,759,111 A | 7/1988 | Cudini | 29/523 |
| 4,986,597 A | 1/1991 | Clausen | 296/205 |
| 5,031,958 A | 7/1991 | Fujita et al. | 296/194 |
| 5,094,313 A | 3/1992 | Mauws | 180/210 |
| 5,106,249 A | 4/1992 | Janotik | 411/43 |
| 5,209,541 A | 5/1993 | Janotik et al. | 296/29 |
| 5,213,386 A | 5/1993 | Janotik et al. | 296/29 |
| 5,228,259 A | 7/1993 | Haddad et al. | 52/653.2 |
| 5,233,789 A | 8/1993 | Priest et al. | 49/360 |
| 5,233,856 A | 8/1993 | Shimanovski et al. | 72/62 |
| 5,269,585 A | 12/1993 | Klages et al. | 296/205 |
| 5,271,687 A | 12/1993 | Holka et al. | 403/233 |
| 5,320,403 A | 6/1994 | Kazyak | 296/203 |
| 5,332,281 A | 7/1994 | Janotik et al. | 296/29 |
| 5,333,775 A | 8/1994 | Bruggermann et al. | 228/157 |
| 5,338,080 A | 8/1994 | Janotik et al. | 296/29 |
| 5,343,666 A | 9/1994 | Haddad et al. | 52/648.1 |
| 5,458,393 A | 10/1995 | Benedyk | 296/203 |
| 5,460,026 A | 10/1995 | Schafer | 72/55 |
| 5,481,892 A | 1/1996 | Roper et al. | 72/61 |
| 5,518,209 A | 5/1996 | Chicoine et al. | 244/158 R |
| 5,549,352 A | 8/1996 | Janotik et al. | 296/209 |
| 5,561,902 A | 10/1996 | Jacobs et al. | 29/897.2 |
| 5,564,785 A | 10/1996 | Schultz et al. | 297/452.2 |
| 5,577,796 A | 11/1996 | Clausen | 296/202 |
| 5,581,947 A | 12/1996 | Kowall et al. | 49/451 |
| 5,582,052 A | 12/1996 | Rigsby | 72/62 |
| 5,600,983 A | 2/1997 | Rigsby | 72/61 |
| 5,632,508 A * | 5/1997 | Jacobs et al. | 280/781 |
| 5,641,176 A | 6/1997 | Alatalo | 280/690 |
| 5,649,735 A | 7/1997 | Tomforde et al. | 296/71 |
| 5,673,929 A | 10/1997 | Alatalo | 280/690 |
| 5,718,048 A * | 2/1998 | Horton et al. | 280/785 |
| 5,720,092 A | 2/1998 | Ni et al. | 29/421.1 |
| 5,720,511 A | 2/1998 | Benedyk | 296/203 |
| 5,765,906 A | 6/1998 | Iwatsuki et al. | 296/203 |
| 5,794,398 A | 8/1998 | Kaehler et al. | 52/653.2 |
| 5,800,003 A | 9/1998 | Clenet | 296/29 |
| 5,845,382 A | 12/1998 | Schultz et al. | 29/421.1 |
| 5,848,853 A | 12/1998 | Clenet | 403/272 |
| 6,003,935 A * | 12/1999 | Kalazny | 280/785 |
| 6,010,182 A | 1/2000 | Townsend | 296/203.01 |
| 6,092,865 A | 7/2000 | Jaekel et al. | |
| 6,102,472 A * | 8/2000 | Wallstrom | 296/203.01 |
| 6,120,059 A * | 9/2000 | Beckman | 180/312 |
| 6,138,358 A * | 10/2000 | Marando | 29/412 |
| 6,183,013 B1 * | 2/2001 | Mackenzie et al. | 280/797 |
| 6,308,412 B1 * | 10/2001 | Christofaro et al. | 29/421.1 |

FOREIGN PATENT DOCUMENTS

| | | |
|---|---|---|
| DE | 4122862 | 1/1993 |
| EP | 0570150 A1 | 11/1993 |
| FR | 694774 | 12/1930 |
| WO | WO/97/00595 | 1/1997 |
| WO | WO99/20516 | 4/1999 |

* cited by examiner

MODULAR SPACE FRAME

This is a continuation-in-part of U.S. patent application Ser. No. 09/173,554, filed Oct. 16, 1998, now U.S. Pat. No. 6,092,865 the entirety of which is hereby incorporated by reference and claims the benefit of provisional application No.60/062,204 filed Oct. 16, 1997.

FIELD OF THE INVENTION

The present invention is generally related to motor vehicle space frames and more particularly to a modular space frame constructed of individual hydroformed members.

BACKGROUND OF THE INVENTION

Space frame architecture is increasingly being used in vehicle construction. A space frame is an assembly of individual frame components that are connected at joints to form a cage-like structure on which the other vehicle components are mounted, including the engine, the drive train, the suspension and the hang-on vehicle body parts. Tubular hydroforming potentially offers many advantages in space frame construction because it would enable manufacturers to increase frame stiffness, dimensional stability, fatigue life, and crash worthiness over nonhydroformed space frames while reducing frame mass and cost.

Hydroforming is a metal-forming process in which high pressure fluid is used to outwardly expand a tubular blank into conformity with surfaces of a die cavity of a die assembly to form an individual hydroformed member. Individual blanks can be hydroformed to have a wide range of longitudinal geometries and each hydroformed member can have a cross-sectional configuration that varies continuously along its length. Holes of various sizes and shapes can optionally be punched in the hydroformed member at selected locations along its length during or after the hydroforming process.

Prior art vehicle frames often included frame parts made by forming several structures by stamping and then welding these several individually stamped structures together. Vehicle manufactures can replace this type of frame part with a single hydroformed part, thereby reducing both the number of parts and the number of welds necessary to complete frame construction. Consequently, vehicle weight and assembly costs are reduced. Hydroformed parts also have higher strength, in part because of the plastic deformation of the wall of the blank during the hydroforming process. More particularly, the outward expansion of the wall of the blank during hydroforming caused by the fluid pressure creates a work-hardening effect which uniformly hardens the metal material of the blank. This allows the manufacturer to replace several stamped frame parts with a single stiffer and lighter weight hydroformed part. Hydroforming also produces less waste metal material than stamping.

Thus, tubular hydroforming has many advantages over conventional stamping and welding. The number of frame parts can be reduced and the overall weight of the frame can be reduced through more efficient cross section design and through tailoring of the wall thickness along the length of each hydroformed part while at the same time achieving increased structural strength and frame stiffness. Tooling costs are lowered because fewer parts are required. Stacked tolerances (i.e., dimensional inaccuracies of the frame) are reduced because of the greater dimensional accuracy of each hydroformed part.

It is also advantageous in the automotive industry to be able to use existing equipment to manufacture space frame components. Because most vehicle body designs change each model year, however, it is usually necessary to change the configuration of the vehicle frame to realize a new vehicle body design and this can make frame component manufacturing equipment used for prior vehicle models obsolete.

A modular approach to space frame design can extend the useful life of space frame component manufacturing equipment because this approach allows portions of a space frame to be used for two or more models and yet allows the vehicle body design to be updated. A modular approach to space frame design would be particularly advantageous in space frame design that is constructed of hydroformed members because of the advantages offered by tubular hydroforming. It would thus be desirable in the automotive industry to have a hydroformed modular space frame that can provide easy assembly and allow the reuse of portions of the vehicle space frame among several vehicle models. It is also desirable to manufacture a space frame using as few parts as possible and to reduce stacked tolerances as much as possible.

SUMMARY OF THE INVENTION

An aspect of the present invention to meet the needs identified provides a vehicle space frame for constructing a motor vehicle, comprising a body module and a front module. The body module includes a pair of laterally spaced, longitudinally extending main side rail structures and a pair of rearward-most upright structures each being connected to a respective main side rail structure and extending upwardly therefrom to form a pair of rearward-most pillars thereon. The body module further includes a pair of hydroformed upper longitudinal members each being defined by an outwardly deformed tubular metallic wall fixed in a predetermined irregular exterior surface configuration and each including a pillar-forming portion and a longitudinally extending portion. Each pillar-forming portion is connected to a respective main side rail structure and extends upwardly therefrom to form an A pillar and each longitudinally extending portion is connected at an opposite end portion thereof with an associated one of said rearward-most pillars, thereby defining a longitudinal length between the associated A- and rearward-most pillars. A plurality of connecting structures are included in the body module and are constructed and arranged to dispose the main side rail structures, the upper longitudinal members, and the pairs of pillars in laterally spaced fixed relation. The front module includes a pair of front lower side rail structures, a pair of front upper side rail structures and front connecting structure. The front connecting structure is constructed and arranged to connect the front lower side rail structures to one another in laterally spaced relation and the front upper side rail structures to one another in laterally spaced relation. The front module is rigidly fixed to the body module by rigidly interconnecting each front lower side rail structure with a respective main side rail structure and each front upper side rail structure to the pillar-forming portion of a respective hydroformed upper longitudinal member at a position spaced upwardly from the associated main side rail structure.

Other aspects, features, and advantages of the present invention will become apparent from the following detailed description, the accompanying drawings, and the appended claims.

DETAILED DESCRIPTION OF THE PREFERRED EMBODIMENT AND BEST MODE

Modular Space Frame for a Pickup-Type Vehicle

Figure 1:
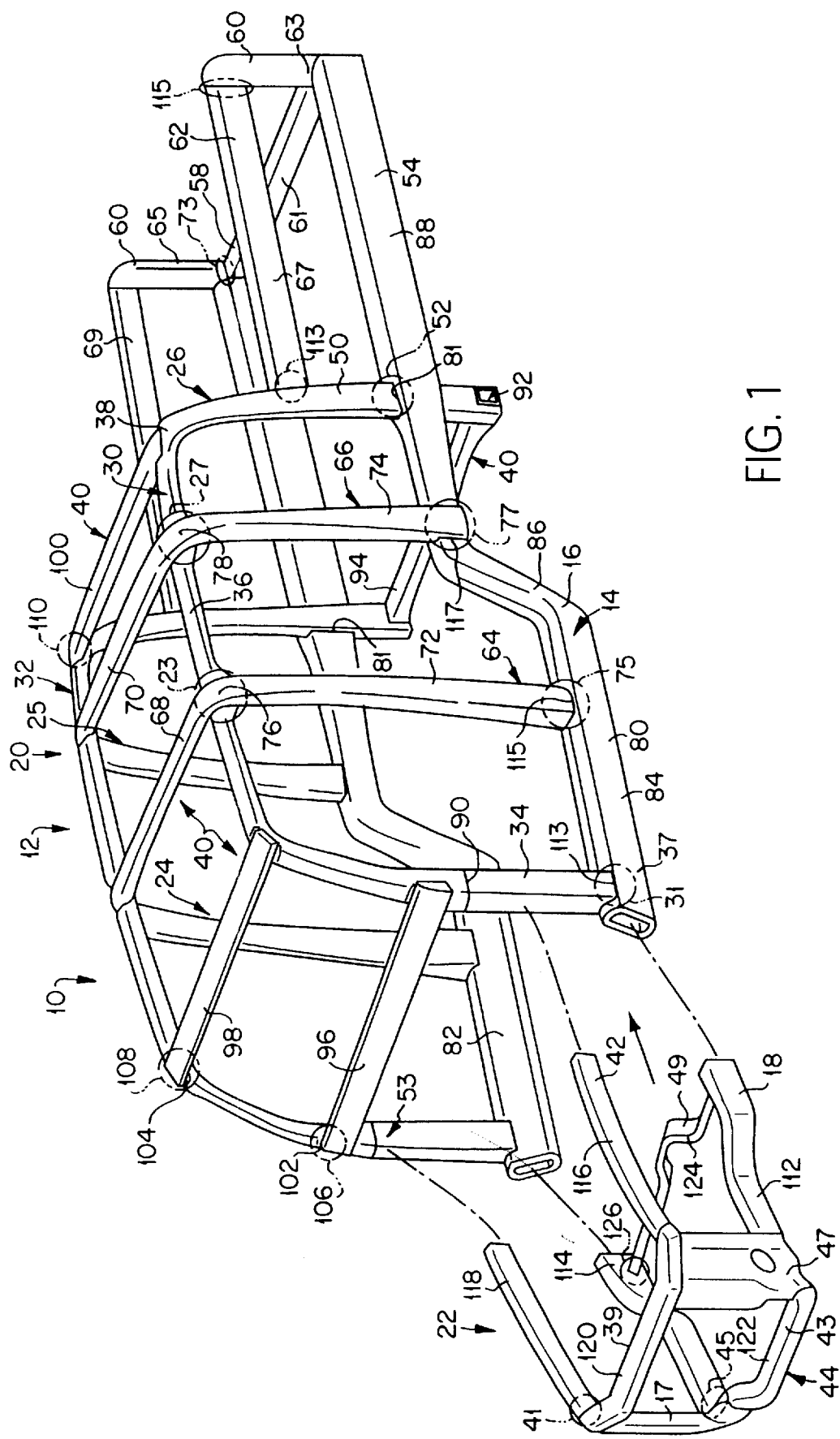
FIG. 1 is a partially exploded perspective view of a space frame for a pickup-type vehicle constructed according to the principles of present invention.

FIGS. 1–4 show several exemplary embodiments of modular space frames for constructing motor vehicles. FIG. 1 shows a modular space frame 10 for a pickup truck-type vehicle. The space frame 10 includes a body module 20 and a front module 22. The body module 20 includes a pair of laterally spaced, longitudinally extending main side rail structures 14 and a pair of rearward-most upright structures 26. Each rearward-most upright structure 26 is connected to a respective main side rail structure 14 and extends upwardly therefrom to form a pair of rearward-most pillars on the main side rail structures 14.

The body module 20 also includes a pair of hydroformed tubular upper longitudinal members 30, 32 each being defined by an outwardly deformed tubular metallic wall fixed in a predetermined irregular exterior surface configuration. The upper longitudinal members 30, 32 are of mirror image construction, so only upper longitudinal member 30 will be discussed in detail, but the discussion applies equally to upper longitudinal member 32. Each upper longitudinal member 30 includes a pillar-forming portion 34 and an integral longitudinally extending portion 36. Each pillar-forming portion 34 is connected to a respective main side rail structure 14 at a joint 37 and extends upwardly therefrom to form a forward-most or "A" pillar thereon.

The longitudinally extending portion 36 of each upper longitudinal member 30 is integrally connected at one end with an associated pillar-forming portion 34 and is connected at an opposite end 38 thereof with an upper end of an associated rearward-most pillar 26 (to form an integral connection therewith as considered below). The longitudinally extending portion 36 of each hydroformed upper longitudinal member 30 thus defines a longitudinal length between the associated forward-most and rearward-most end pillars 26, 34 on each side of the body module 20. The longitudinal length defined by the integral hydroformed structure minimizes the stacked tolerances between the forward-most and rearward-most pillars as taught and described in detail in commonly assigned U.S. patent application Ser. No. 09/173,554 and entitled HYDROFORMED SPACE FRAME AND METHOD OF MANUFACTURING THE SAME hereby incorporated by reference in its entirety into the present application for all material disclosed therein. Each longitudinally extending portion 36 also provides a roof supporting structure or roof rail structure therebetween.

A plurality of laterally extending connecting structures, generally designated 40, are connected between the main side rail structures 14, between the upper longitudinal members 30, 32, and between the rearward-most pillars 26. The plurality of connecting structures 40 are constructed and arranged to secure the main side rail structures 14, the upper longitudinal members 30, 32, and the pairs of pillars 34, 26 (i.e., the A pillars 34 and the rearward-most pillars 26) in laterally spaced, fixed relation.

Each upper longitudinal member 30 further includes a second hydroformed pillar-forming portion 50 extending integrally downwardly from the opposite end 38 of the longitudinally extending portion 36 thereof and forming a joint 52 with the associated main side rail structure 14 so that each upper longitudinal member 30 has a generally inverted U-shaped configuration. Each second pillar-forming portion 50 forms the rearward-most or "D" pillar 26 on each main side rail structure 14.

Each main side rail structure 14 extends rearwardly beyond the joint 52 with the second pillar-forming portion 50 of the associated upper longitudinal member 30, 32 so that the rearward-most portion of each main side rail structure 14 defines a lower side rail 54 of a bed portion of a pickup truck-type vehicle. The space frame 10 further includes a bed cross structure 58 extending laterally between the free ends of the bed forming lower portions 54 of the main side rail structures 14. A pair of bed upright structures 60 each extend upwardly from a respective free end of the bed cross structure 58. Each of a pair of longitudinally extending bed upper side rail structures 62 are connected between a respective bed upright structure 60 and an intermediate portion of the second pillar-forming portion 50 of the associated upper longitudinal member 30, 32 (i.e., the associated D pillars).

The space frame 10 includes two pairs of intermediate upright structures 24 and 25. The pair members of each is pair 24, 25 are connected between a respective main side rail structure 14 and the longitudinally extending portion 36 of an associated upper longitudinal member 30, 32 thereby forming a pair of intermediate pillars of the body module 20. The pairs 24 and 25 constitute the B pillars and the, C pillars, respectively, of the body module 20.

The B and C pillars are preferably provided by a pair of tubular hydroformed U-shaped cross members 64, 66. Each member 64, 66 is defined by an outwardly deformed tubular metallic wall fixed in a predetermined irregular exterior surface configuration and each member 64, 66 is mounted laterally between the main side rail structures 14 of the body module 20. Each U-shaped cross member 64, 66 includes a cross portion 68, 70, respectively, and a pair of leg portions 72, 74, respectively, extending integrally from respective junctures 76, 78 at opposite ends of the respective cross portion 68, 70. Each leg portion 72, 74 of each U-shaped cross member 64, 66 is connected at a free end thereof to a respective main side rail structure 14 at respective joints 75, 77 therewith and extends upwardly therefrom.

Each juncture 76, 78 of each U-shaped member 64, 66 is connected to the longitudinally extending portion 36 of the associated upper longitudinal member, 30, 32 at joints 23, 27, respectively, so that the leg portions 72, 74 of the first and second U-shaped cross members 64, 66 thereby form the first and second pairs of longitudinally spaced corresponding, laterally spaced intermediate (B and C) pillars 24, 25, as mentioned. Preferably, the joints 23, 27 are formed by welding the junctures 76, 78 in recesses formed in the upper longitudinal member 30 according the principles taught in the incorporated patent application reference Ser. No. 09/173,554, although the formation of a recess in either member is not necessary to form either joint 23, 27. The members could be, for example, welded together without a recess. The cross portions 68, 70 extend laterally between the longitudinally extending portions 36 of the upper longitudinal members 30, 32 and between the pillars 24, 25, thereby defining a lateral length between the pairs of corresponding intermediate pillars, 24, 25. The cross portions 68, 70 also provide part of the laterally extending connecting structure 40 of the body module 20 that is constructed and arranged to connect the intermediate pillars to one another in laterally spaced, fixed relation.

The front module 22 includes a pair of front lower side rail structures 18, a pair of front upper side rail structures 42 and front connecting structure, generally designated 44. The front connecting structure 44 is constructed and arranged to connect (i) the front lower side rail structures 18 to one another in laterally spaced fixed relation and (ii) the front upper side rail structures 42 to one another in laterally spaced fixed relation.

The front connecting structure 44 includes (1) a laterally extending forward upper cross structure 39 connected between the forward ends of the front upper side rail structures 42 at butt welded joints 41, thereby forming the bight portion and leg portions respectively of a front upper U-shaped structure, (2) a laterally extending forward lower cross structure 43 connected between the forward ends of the front lower side rail structures 18 at butt welded joints 45, thereby forming the bight portions and leg portions respectively of a front lower U-shaped structure, (3) a pair of laterally spaced, vertically extending connecting structures 47 each being connected generally between the bight portions 39, 43 of the front upper U-shaped structure and the lower front U-shaped structure and (4) a laterally extending connecting structure 49 connected between the pair of leg portions (provided by the front lower side rail structures 18) of the front lower U-shaped structure.

The front module 22 is rigidly fixed to the body module 20 by rigidly interconnecting (1) each front lower side rail structure with a respective main side rail structure 14 (to form telescopically interengaged and welded joints therebetween that are not shown but which are indicated by a dashed line in FIG. 1) and (2) each front upper side rail structure 42 to a pillar-forming portion 34 of a respective hydroformed upper longitudinal member 30, 32 at a position spaced upwardly from the associated main side rail structure 14 (at butt welded joints that are not shown but which are indicated by a dashed line in FIG. 1). The rearward end of each front upper side rail structure 42 is connected at a position spaced upwardly from the associated main side rail structure 14.

Preferably the main side rail structures 14 are provided by a pair of hydroformed tubular main side rail members 80, 82 of mirror image construction. Only side rail member 80 is considered in detail, but the discussion applies equally to member 82. The hydroformed side rail member 80 has an essentially straight forward portion 84, which transitions into an upwardly angled intermediate portion 86 which in turn transitions into an essentially straight rearward portion 88 (which provides the lower side rail 54 of the bed portion of the pickup truck bed).

The upper longitudinal member 30 is formed from a tubular metal blank that includes a butt weld connection 90. The structure and construction of the blank including the butt weld connection 90 and the subsequent hydroforming thereof is considered in detail below. The end portion of the second pillar-forming portion 50 of the longitudinally extending portion 30 has an essentially rectangular cross section and extends below the hydroformed side rail member 80 through a notch 81 therein. Preferably the upper longitudinal member 30 is welded into the notch 81 to form the joint 52. The end portion is provided with a cut out notch 92. A cross member 94 that is preferably of hydroformed construction and which forms a part of the laterally extending connecting structure 40 of the body module 20 is mounted in respective notches 92 in the upper longitudinal members 30, 32 and is secured therein by welding or by other appropriate means.

Three laterally extending essentially straight cross members 96, 98, 100 (preferably formed by hydroforming) are mounted between the upper longitudinal members 30, 32. Specifically, the pair of cross members 96, 98 are rigidly fixed (preferably by welding) within hydroformed recesses 102, 104, respectively, formed in the upper longitudinal members 30, 32 to form joints 106, 108, respectively. The cross member 100 is of generally tubular construction but is provided with flattened end portions that are disposed in overlying relation with the longitudinally extending portion 36 of each upper longitudinal member 30 and welded thereto to forming joints 110.

Preferably the bed cross structure 58 and bed upright structures 60 are provided by three separate essentially straight hydroformed tubular members 61, 63, 65, respectively, that are butt welded together at joints 73. Preferably the hydroformed members 63, 65 are butt welded to respective ends of the hydroformed member 61 that provides the cross structure 58. Similarly, each upper side rail structure 62 is preferably provided by an essentially straight hydroformed tubular member 67, 69 that is connected to the space frame at joints 113, 115 by butt welding. Alternatively, the cross structure 58 and the pair of upright structures 60 at the rear of the bed portion of the space frame 10 can be provided by the leg portions and cross portion of an integral hydroformed U-shaped member (not shown) or by any other appropriate construction.

Preferably the front lower side rail structures 18 and the front upper side rail structures 42 are provided by individual hydroformed members 112, 114, 116, 118, respectively. Similarly, the forward upper and lower cross structures 39, 43 and the cross structure 49 are preferably provided by hydroformed members 120, 122, 124, respectively (although any appropriate construction can be used). The hydroformed members 116, 118, 120 are preferably connected by welding at joints 41, the hydroformed members 112, 114, 122 are preferably connected by welding at joints 45 and the hydroformed members 112, 114, 124 are preferably connected by welding at joints 126. The vertically extending connecting structures 47 are preferably skeletonized sheet metal structures formed by stamping or by any other appropriate means and are secured between the cross members 120, 122 by welding or by any other suitable means. The joints 37, 75 are formed by welding the hydroformed members 30, 72 in openings 113, 115, respectively, in the main side rail structures 14. Joint 77 can be formed by welding a notched portion 117 of the U-shaped member 74 to the upper and outer side surfaces of the main side rail structures 14.

Modular Space Frame for a First Embodiment of a Sport-Utility-Type Vehicle

Figure 2:
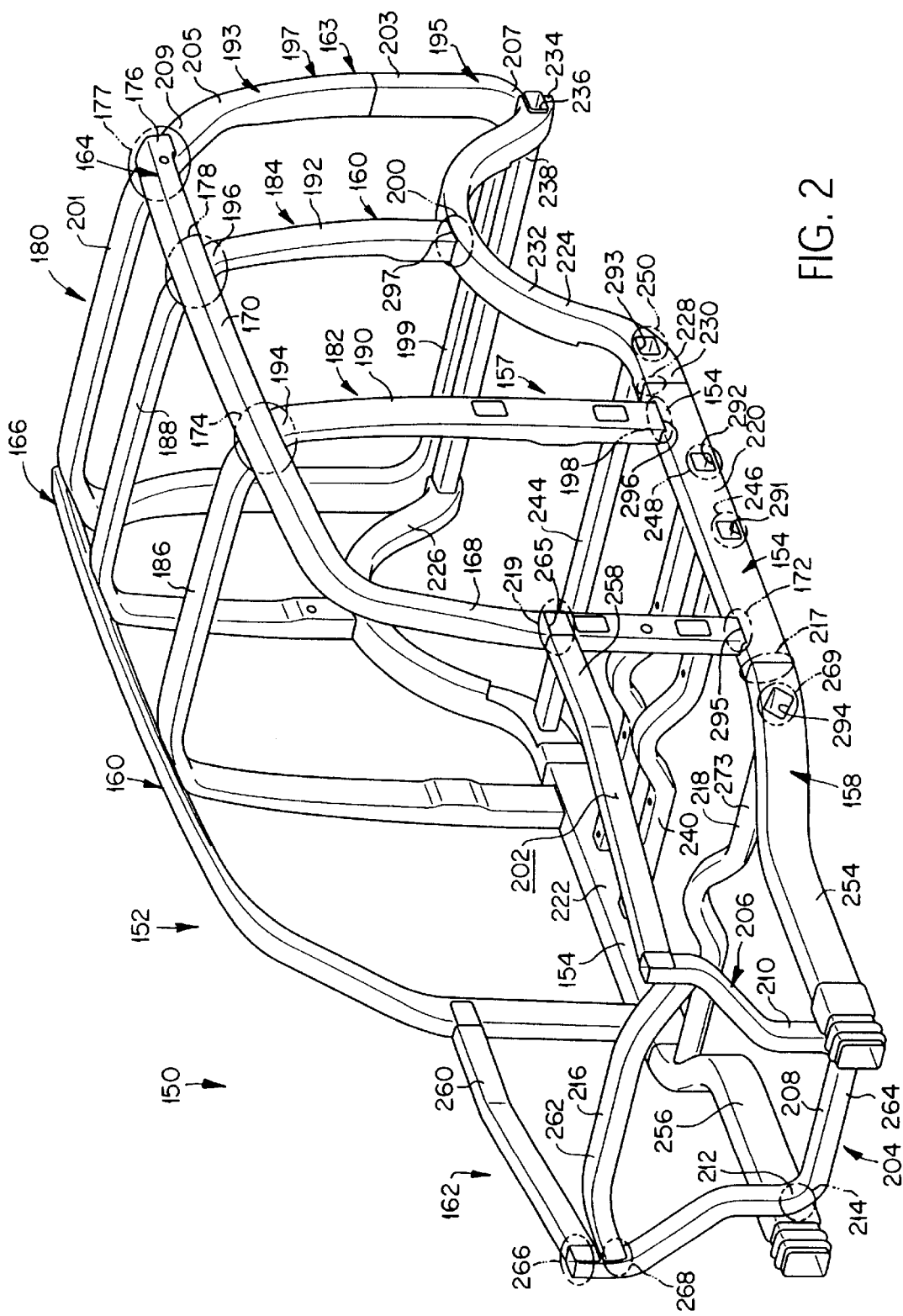
FIG. 2 is a perspective view of a space frame for a sports utility-type vehicle constructed according to the principles of present invention.
Figure 3:
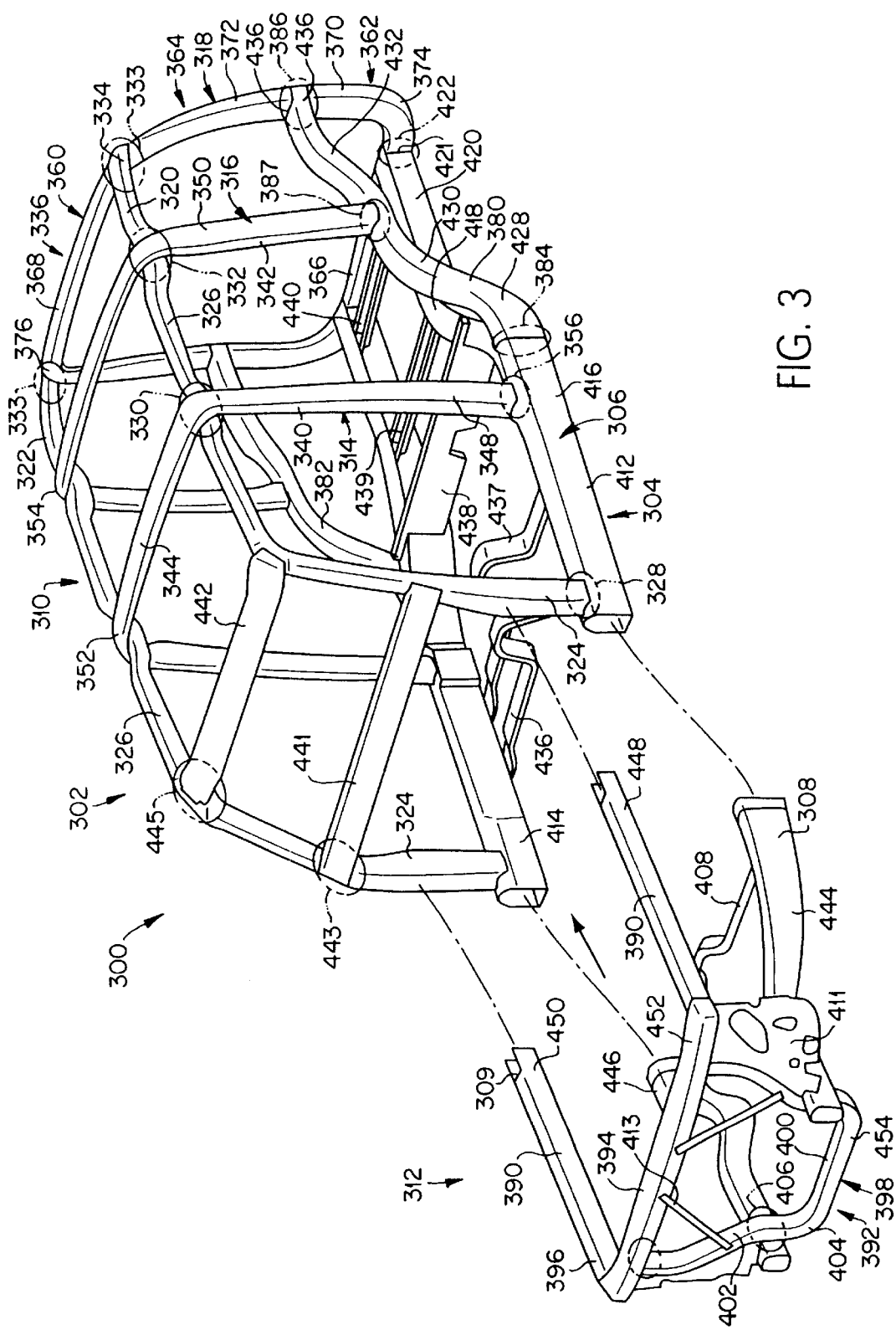
FIG. 3 is a partially exploded perspective view of a second embodiment of a space frame for a sports utility-type vehicle constructed according to the principles of present invention.

FIGS. 2 and 3 show exemplary modular space frames 150 and 300, respectively, for sports utility-type vehicles. The space frame 150 includes a body module 160 and a front module 162. The body module 160 includes a pair of laterally spaced, longitudinally extending main side rail structures 154 and a pair of rearward-most upright structures 163. Each rearward-most upright structure 163 is connected to a respective main side rail structure 154 and extends upwardly therefrom to form a pair of rearward-most pillars of the body module 160.

The body module 160 also includes a pair of hydroformed tubular upper longitudinal members 164, 166 each being defined by an outwardly deformed tubular metallic wall fixed in a predetermined irregular exterior surface configuration. The upper longitudinal members 164, 166 are of mirror image construction. Therefore only upper longitudinal member 164 will be discussed in detail, but the discussion applies equally to upper longitudinal member 166. Each upper longitudinal member 166 includes a pillar-forming portion 168 and an integral longitudinally extending portion 170. Each pillar-forming portion 168 is connected to a respective main side rail structure 154 at a joint 172 and extends upwardly therefrom to form a forward-most or "A" pillar thereon.

The longitudinally extending portion 170 of each upper longitudinal member 164 is integrally connected at one end with an associated pillar-forming portion 168 and is connected at an opposite end 176 thereof with an upper end of an associated rearward-most (or "D") pillar 162 (at joint 177). Each rearward-most pillar is provided by a portion of a rearward ring assembly 193 in a manner described below. The longitudinally extending portion 170 of each hydroformed upper longitudinal member 164 thus defines a longitudinal length between the associated forward-most and rearward-most end pillars 168, 162 on each side of the body module 160 (according to the principles of the Ser. No. 09/173,554 incorporated by its entirety herein). Each longitudinally extending portion 170 also provides a roof supporting rail structure between the forward- and rearward-most end pillars 168, 162.

A plurality of laterally extending connecting structures generally designated 180 are connected between the main side rail structures 154, between the upper longitudinal members 164, 166 and between the rearward-most pillars 162. The plurality of connecting structures 180 are constructed and arranged to secure the main side rail structures 154, the upper longitudinal members 164, 166 and the rearward-most pillars 162 in laterally spaced, fixed relation.

The space frame 150 includes two pairs of intermediate upright structures 157 and 160. The pair members of each pair 157, 160 are connected between a respective main side rail structure 154 and the longitudinally extending portion 170 of an associated upper longitudinal member 164, 160 thereby forming a pair of intermediate pillars of the body module. The pairs 157 and 160 constitute the B pillars and the C pillars, respectively, of the body module.

Preferably, the B and C pillars are provided by a pair of tubular hydroformed U-shaped cross members 182, 184. Each member 182, 184 is defined by an outwardly deformed tubular metallic wall fixed in a predetermined irregular exterior surface configuration and each member 182, 184 is mounted between the main side rail structures 154 of the body module. Each U-shaped cross member 182, 184 includes a cross portion 186, 188, respectively, and a pair of leg portions 190, 192, respectively, extending integrally from respective junctures 194, 196 at opposite ends of the respective cross portion 186, 188. Each leg portion 190, 192 of each U-shaped cross member 182, 184 is connected at a free end thereof to a respective main side rail structure 154 at respective joints 198, 200 therewith and extends upwardly therefrom.

Each juncture 194, 196 of each U-shaped member 182, 184 is connected to the longitudinally extending portion 170 of the associated upper longitudinal member, 164, 166 at joints 174, 178, respectively, so that the leg portions 190, 192 of the first and second U-shaped cross members 182, 184 thereby form the first and second pairs of the corresponding laterally spaced intermediate pillars 157, 160. The cross portions 186, 188 extend laterally between the longitudinally extending portions 170 of the upper longitudinal members 164, 166 and between the pillars 157, 160, respectively, thereby defining a lateral length between the corresponding intermediate pillars, 157, 160. The cross portions of the U-shaped members 182, 184 thereby minimize stacked tolerances between the associated intermediate pillars as discussed in incorporated Ser. No. 09/173,554. The cross portions 186, 188 also provide part of the laterally extending connecting structure of the body module that is constructed and arranged to connect the pair members of the pairs of intermediate pillars to one another, respectively, in laterally spaced, fixed relation. Preferably, the joints 174, 178 are formed by welding the members 182, 164 and 184, 164 in overlying surface-to-surface relation.

The space frame 150 includes a rearward ring assembly 193 comprising a tubular hydroformed lower U-shaped member 195 and a tubular hydroformed inverted upper U-shaped member 197, the U-shaped members 195, 197 each being defined by an outwardly deformed tubular metallic wall fixed in a predetermined, irregular exterior surface configuration and each having a cross portion 199, 201, respectively, and integral leg portions 203, 205, respectively, extending from junctures 207, 209 at opposite ends thereof. The ring assembly 193 is formed by fixedly interconnecting end portions of the leg portions 205 of the upper U-shaped member with respective end portions of the leg portions 203 of the lower U-shaped member 195.

The rearward ring assembly 193 is connected to the body module such that the opposite ends 176 of the longitudinally extending portions 170 of the upper longitudinal members 164 are connected with respective junctures 209 of the upper U-shaped member 197. The lower U-shaped member 195 is connected across respective rearward ends of the main side rail structures. The connected leg portions 203, 205 provide the rearward-most pillars of the body module and the cross portions 199, 201 of the upper and lower U-shaped members 197, 195 provide laterally extending cross structures of the plurality of cross structures between the rearward-most pillars. Preferably, the joint 177 has a similar welded surface-to-surface configuration (between tubular hydroformed members 164, 197) as joints 174, 178.

The front module 162 includes a pair of front lower side rail structures 158, a pair of front upper side rail structures 202 and front connecting structure, generally designated 204, which is constructed and arranged to connect the front lower side rail structures 158 to one another in laterally spaced relation and the front upper side rail structures 202 to one another in laterally spaced relation.

The front connecting structure 204 includes (1) a laterally extending front U-shaped cross structure 206, (2) a laterally extending elongated front connecting structure 216, and (3) a laterally extending elongated connecting structure 218. The front U-shaped cross structure 206 has a cross portion 208 and a pair of leg portions 210 extending from junctures 212 at opposite ends of the cross portion 208. The forward end of each front lower side rail structure 158 is connected with a juncture 212 (at welded or other suitably formed joints 214). The forward end of each front upper side rail structure 202 is connected with a free end of an associated leg portion 210 of the front U-shaped cross structure 206 (at joints 266). The front connecting structure 216 is connected between the leg portions 210 of the front U-shaped cross structure (at joints 268). The connecting structure 218 is connected between the front lower side rail structures 158 (at joints 269).

The front module 162 is rigidly fixed to the body module 160 by rigidly interconnecting (1) each front lower side rail structure 158 with a respective main side rail structure 154 (at joints 217) and (2) each front upper side rail structure 202 to the pillar-forming portion 168 of a respective hydroformed upper longitudinal member 164, 166 (at joints 219) at a position spaced upwardly from the associated main side rail structure 154.

Preferably each main side rail structure 154 is provided by a tubular hydroformed first main side rail member 220, 222, respectively (on each side of the space frame) and a tubular hydroformed second main side rail member 224, 226, respectively. The first members 220, 222 and the second members 224, 226 are of mirror image construction so only members 220 and 224 will be discussed in detail. The first side rail member 220 is essentially straight and is connected to the second side rail member 224 at joint 228. The second side rail member 224 has an essentially straight forward portion 230 which transitions into an upwardly arching intermediate portion 232 which in turn transitions into an essentially straight rearward portion 234. The arched intermediate portion 232 forms a rear wheel well of the space frame 150.

The opposing walls of the rearward portion 234 of the second side rail member 224 are each provided with a cut out notch 236 and cross member 238 (which forms a part of the laterally extending connecting structure 180 of the body module 160 and which is preferably of hydroformed construction) is mounted in respective notches 92 and is secured therein by a weld connection. The cross portion 199 of the lower U-shaped member 195 of the rearward ring assembly 193 is welded along its length to the cross member 238 to help secure the lower portion of the rearward ring assembly 193 to the side rail structures.

Three laterally extending cross members 240, 242, 244 (preferably formed by hydroforming) are mounted between the main side rail structures 154 of the body module 160. Specifically, the cross members 240, 242 are mounted between the first side rail members 220, 222 at joints 246 and 248, respectively; the cross member 244 is mounted between the second side rail members 224, 226 and forms a joint 250 therewith at each end thereof. Preferably cross structure 218 is provided by a tubular hydroformed cross member 273 and is connected to the front module at joints 269.

Preferably the front lower side rail structures 158 and the front upper side rail structures 202 are provided by individual tubular hydroformed front lower rail members 254, 256 and tubular hydroformed front upper rail members 258, 260, respectively. The tubular hydroformed members 254 and 256 are connected to the first side rail members 220, 222, respectively at joints 217. The tubular hydroformed members 258 and 260 are connected to the upper longitudinal members 164, 166, respectively, at joints 219. Preferably the joints 217, 228 are formed by telescopically interengaging the associated tubular hydroformed members 254, 220 and 220, 224 and then welding the associated members together. The joint 219 is formed by cutting a pair of notches 265 in the member 258 to receive member 164 and welding the members 258, 164 together. The joint 266 is of similar construction. Preferably the joint 268 is formed by butt welding the members 262 and 264. The joints 246, 248, 250 and 269 are formed by placing the members 240, 242, 244, 273 through the openings 291, 292, 293 and 294, respectively, in the rail structures 154 and welding. Preferably, joints 172, 198 and 200 are formed by welding members 164, 182, 184, respectively, in openings 295, 296, 297, respectively, on main side rail structure 154.

Preferably, the forward upper cross structure 216 and the U-shaped cross structure 206 are provided by tubular hydroformed members 262 and 264, respectively. The hydroformed members 258 and 260 are connected to the U-shaped tubular hydroformed member 264 at joints 266 (similar in construction to jnts 219). Opposite ends of the cross member 262 are connected joints 268 with the leg portions 210 of the tubular hydroformed U-shaped member 264.

It can be appreciated that the space frame 150 is intended to be exemplary only and is not intended to limit the scope of the invention. Accordingly, variations of the structure of the space frame 150 are contemplated and within the scope of the present invention. For example, it is contemplated to provide an embodiment of a space frame identical to the space frame 150 except that each main side rail structure 154 and each front lower side rail structure are both part of the body module. Each main side rail structure and the associated front lower side rail structure can be provided, for example, by a single integral rail structure (which can be of hydroformed construction) that is part of the body module.

Thus, embodiments of space frames, such as space frame 150, are contemplated in which the front upper side rail structures and the front connecting structure connected therebetween (for example, the U-shaped cross structure 206, the upper cross structure 216 and the upper side rail structures 202 in the space frame 150) constitute the front module. It can be understood that these 206, 216, 202 structures of the front module 162 in large part determine the structure of the front portion of a the space frame 150. By designing the space frame 150 such that these structures 206, 216, 202 constitute the front module, the space frame (and the body module) can be constructed, for example, so that the main side rail structure and the front lower side rail structure on each side of the space frame are provided by a single integral structure.

It can be understood that although only one front module is shown in FIG. 2 (and in FIGS. 1, 3 and 4), it is contemplated, for example, to provide a series of differently constructed front modules, each of which is constructed and arranged to be connected to a particular body module (such as body module 160, for example). A series of differently configured space frames can thus be assembled by selecting one in the series of differently constructed front modules and mounting the selected front module to a body module.

The shape and the length of the upper and lower front side rail members and of the front connecting structure can be varied to provide a range of front module heights, front module widths (in the cross car direction) and front module lengths (and thus vehicle lengths). It can also be understood that when the front lower side rail structures are part of the body module (whether joined to the main side rail structures at a joint or integrally connected thereto), the body module will determine the vehicle length.

Space Frame for a Second Embodiment of a Sports Utility-Type Vehicle

FIG. 3 shows a space frame generally designated 300 for an embodiment of a sports utility type vehicle. The space frame 300 includes a body module 310 and a frontal module 312. The main body module 310 includes a pair of laterally spaced, longitudinally extending main side rail structures 304 and a pair of rearward-most upright structures 318. Each rearward-most upright structure 318 is connected to a respective main side rail structure 304 and extends upwardly therefrom to form one of a pair of rearward-most pillars thereon.

The body module 310 also includes a pair of hydroformed upper longitudinal members 320, 322, each being defined by an outwardly deformed tubular metallic. wall fixed into a predetermined irregular exterior surface configuration. The upper longitudinal members 320, 322 are both of mirror image construction so only member 320 will be discussed in detail, but the discussion applies to member 322 as well. Each upper longitudinal member 320 includes a pillar-forming portion 324 and an integral longitudinally extending portion 326. Each pillar-forming portion 324 is connected to a respective main side rail structure 304 at a joint 328 and extends upwardly therefrom to form a forward-most pillar or "A" pillar thereon.

The longitudinally extending portion 326 of each upper longitudinal member 320 is integrally connected at one end with an associated pillar-forming portion 318 and is connected at an opposite end 334 thereof with an upper end of an associated rearward-most pillar 318 (at joint 333). The longitudinally extending portion 326 of each hydroformed upper longitudinal member 320 thereby defines a longitudinal length between the associated forward-most and rearward-most pillars 324, 318 on each side of the body module 310 (as taught in Ser. No. 09/173,554). Each longitudinally extending portion 326 also provides a roof supporting rail structure between the forward- and rearward-most pillars 324, 318. The joint 333 is of similar construction to joint 177 of FIG. 2. A plurality of connecting structures, generally designated 336, are constructed and arranged to secure the main side rail structures 304, the upper longitudinal members 320, 322 and the pillars 318, 324 in laterally spaced, fixed relation.

The space frame 300 further includes a rearward ring assembly 360 comprising a tubular hydroformed lower U-shaped member 362 and a tubular hydroformed inverted upper U-shaped member 364. The U-shaped members 362, 364 are each defined by an outwardly deformed tubular metallic wall fixed in a predetermined, irregular exterior surface configuration and each has a cross portion 366, 368, respectively, and integral leg portions 370, 372, respectively, extending from junctures 374, 376 at opposite ends thereof. The ring assembly 360 is formed by fixedly interconnecting end portions of the leg portions 372 of the upper U-shaped member 364 with respective end portions of the leg portions 370 of the lower U-shaped member 362.

The rearward ring assembly 360 is connected such that the opposite ends 334 of the longitudinally extending portions 326 of the upper longitudinal members 320, 322 are connected with respective junctures 376 of the upper U-shaped member 364 and rearward ends of the main side rail structures 304 are connected with the cross portion 366 of the lower U-shaped member 362. The interconnected leg portions 370, 372 provide the rearward-most pillars 318. The cross portions 366, 368 of the upper and lower U-shaped members 364, 362 provide laterally extending cross structures of the plurality of cross structures 360 between the rearward-most pillars 318. The body module 310 further includes a pair of secondary side rail structures 380, 382, respectively. Each secondary side rail structure 380, 382 is connected between an intermediate portion of the main side rail structure 304 (at joint 384) and an intermediate portion of the associated rearward-most pillar 318 formed by the rearward ring assembly 360 (at joint 386).

The space frame 300 further includes a pair of tubular hydroformed U-shaped cross members 340, 342, each being defined by an outwardly deformed tubular metallic wall fixed in a predetermined irregular exterior surface configuration. Each U-shaped cross member 340, 342 includes a cross portion 344, 346, respectively, and a pair of leg portions 348, 350, respectively, extending integrally from junctures 352, 354, respectively, at opposite ends thereof.

Each leg portion 348 of the first U-shaped cross member 340 is connected at a free end thereof to a respective main side rail structure 304 (at a joint 356) and extends upwardly therefrom and each juncture 352 thereof is connected to the longitudinally extending portion 326 of the associated upper longitudinal member 320, 322 (at a joint 330), the leg portions 348 of the first U-shaped cross member 340 thereby forming a first pair of corresponding laterally spaced intermediate pillars 314 constituting a pair of B pillars of the body module. The cross portion 344 of the cross member 340 extends laterally between the first pair of intermediate pillars 314, thereby providing a laterally extending connecting structure between and defining a lateral length between the first pair of corresponding intermediate pillars 314.

Each leg portion 350 of the second U-shaped cross member 342 is connected at a free end thereof to a respective secondary lower side rail structure 380, 382 (at joints 387) and extends upwardly therefrom. Each juncture 354 thereof is connected to the longitudinally extending portion 326 of the associated upper longitudinal member 320, 322 (at a joint 332). The leg portions 350 of the second U-shaped cross member 342 thereby form a second pair of corresponding laterally spaced intermediate pillars 316 constituting a pair of C pillars of the body module 310. The cross portion 346 of the cross member 342 extends laterally between the second pair of intermediate pillars 316, thereby providing a laterally extending cross structure between and defining a lateral length between the second pair of corresponding intermediate pillars 316. Joints 328, 356 and 387 are of similar construction to joint 172 of FIG. 2. The joints 330, 332 are of similar construction to joints 23 and 27 of FIG. 1.

The front module 312 includes a pair of front lower side rail structures 308, a pair of front upper side rail structures 390 and front connecting structure, generally designated 392. The front connecting structure 392 is constructed and arranged to connect the front lower side rail structures 308 to one another in laterally spaced relation and the front upper side rail structures 390 to one another in laterally spaced relation.

The front connecting structure 392 includes (1) a laterally extending forward upper cross structure 394, a laterally extending front U-shaped cross structure 398 and a laterally extending elongated connecting structure 408. The laterally extending forward upper cross structure 394 is connected between the forward ends of the front upper side rail structures 390, the cross structure 394 and the rail structures 390 thereby forming the bight portion and leg portions, respectively, of a front upper U-shaped structure 396. The laterally extending front U-shaped cross structure 398 has a cross portion 400 and a pair of leg portions 402 extending from junctures 404 at opposite ends of the cross portion 400. The forward end of each front lower side rail structure 308 is connected with a juncture 404 (at welded joint 406) of the front U-shaped cross structure 398. Each leg portion of the front U-shaped cross structure 398 is connected with the forward upper cross structure 394 (at welded joints that are not visible). The laterally extending elongated connecting structure 408 is connected between the front lower side rail structures 308 (at welded joints not shown). A pair of reinforcing structures 411, each preferably constructed of stamped skeletonized sheet metal, and a pair of reinforcing rods 413 are mounted on each side of the front module 312.

The front module 312 is rigidly fixed to the body module 310 by rigidly interconnecting (1) each front lower side rail structure 308 with a respective main side rail structure 304 (at telescopic welded joints not shown but indicated by a dashed line in FIG. 3) and (2) each front upper side rail structure 390 to the pillar-forming portion 324 of a respective hydroformed upper longitudinal member 320, 322 (at welded joints not shown but formed within notches 309 as indicated by a dashed line in FIG. 3) at a position spaced upwardly from the associated main side rail structure 304.

Preferably each main side rail structure 304 is provided by a pair of longitudinally extending, laterally spaced tubular hydroformed main side rail members 412, 414, respectively. The members 412, 414 are of mirror image construction so only member 412 will be discussed in detail. The first side rail member 412 is an integral tubular hydroformed structure defined by an outwardly deformed tubular metallic wall fixed into a predetermined exterior configuration. The member 412 has an essentially straight first portion 416 which transitions into an essentially straight inwardly angled intermediate portion 418 which transitions into an essentially straight rearward portion 420 which connects to the rearward ring assembly 360 at joint 422. A segment of the cross portion 366 of the lower U-shaped member is welded within a notch 421 formed in the member 420 to form the joint 422.

The secondary side rail structures 380, 382 are preferably provided by a pair of tubular hydroformed secondary side rail members 424, 426 of mirror image construction. Because of this mirror image construction, only member 424 will be discussed in detail. The secondary side rail member 424 has a short, essentially straight forward-most portion 428 which transitions into an upwardly arched intermediate portion 430 which transitions into an upwardly angled arcuate portion 432. The arcuate portion 432 transitions into an essentially straight rearward-most portion 434. Upper and lower wall portions of the straight portion 434 have been cut-out and removed to form a pair of rearwardly facing notches 436. A portion of the rearward ring assembly 360 is received within the notches 436 and welded to form joint 386. Side wall portions of the side rail member 224 have been cut out and removed to form a side opening (not shown) to receive a portion of the main side rail member 412. The side rail member 412 is welded within the opening to form the joint 384.

Five laterally extending cross structures 436, 437 438, 439, 440 (which provide part of the laterally extending cross section 336) are mounted between the main side rail members 412, 414. A pair of laterally extending cross structures preferably provided by hydroformed cross members 441, 442 are connected between the upper longitudinal members 320, 322 at joints 443, 445, respectively.

Preferably the front lower side rail structures 308 and the front upper side rail structures 390 are provided by individual hydroformed member 444, 446, 448, 450, respectively. Similarly, preferably the forward upper cross structure 394 and the U-shaped cross structure 398 are provided by tubular hydroformed members 452 and 454, respectively.

Modular Space Frame for a Sedan-Type of Vehicle

Figure 4:
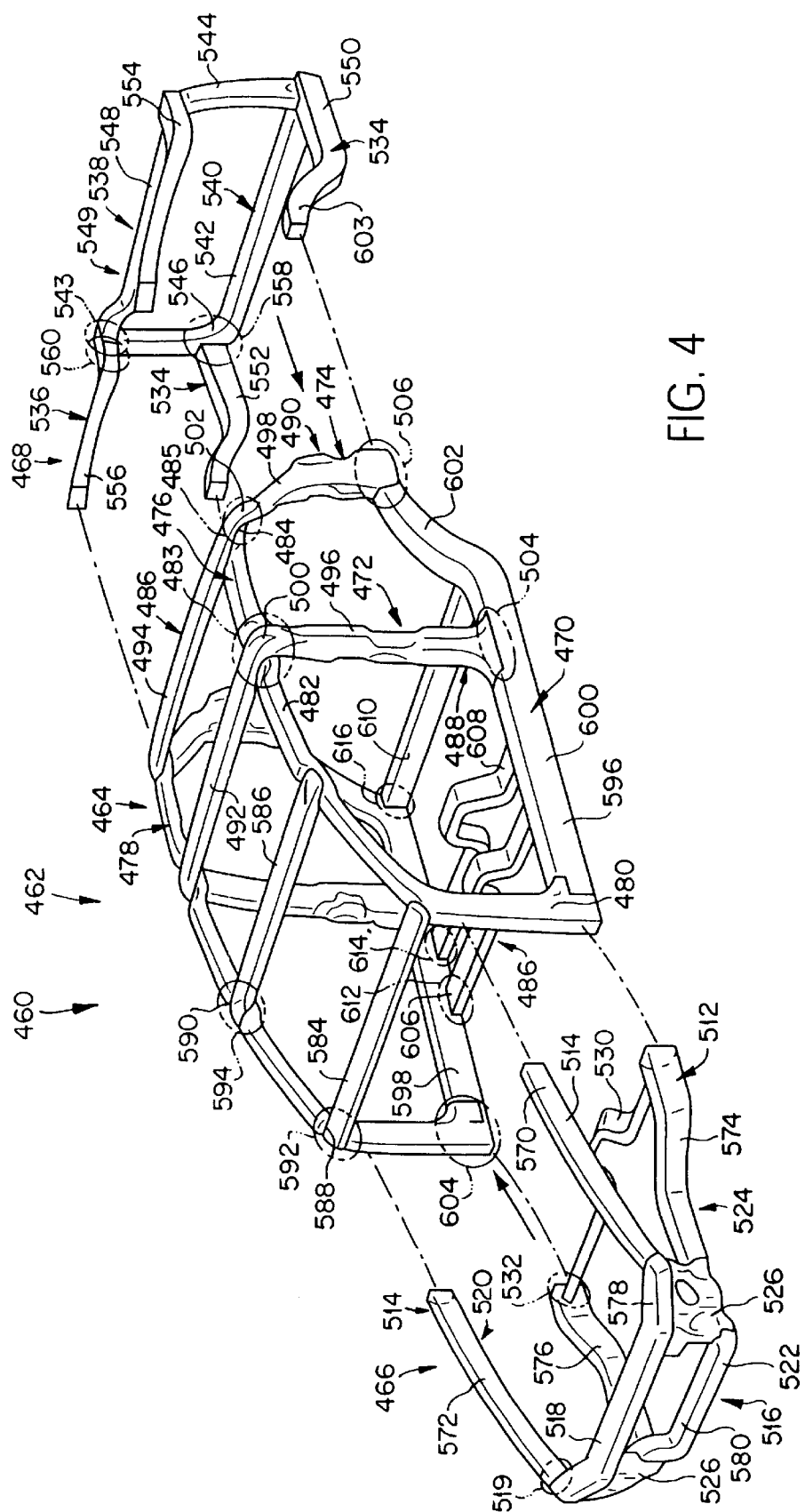
FIG. 4 is a partially exploded perspective view of a space frame for a sedan-type vehicle constructed according to the principles of present invention.

FIG. 4 shows a modular space frame generally designated 460 for constructing a sedan-type motor vehicle. The space frame 460 includes (a) a body module 464, (b) a front module 466 and (c) a rearward module 468.

The body module 464 includes a pair of main side rail structures 470 and a pair of corresponding rearward-most upright structures 474, each being connected to a main side rail structure 470 and extending upwardly therefrom and defining a pair of rearward-most (or "C") pillars of the body module 464. A pair of hydroformed tubular upper longitudinal members 476, 478 form part of the body module 464. The upper longitudinal members 476, 478 are of mirror image construction so only member 476 will be discussed in detail.

Each upper longitudinal member 476 is defined by an outwardly deformed tubular metallic wall fixed in a predetermined irregular exterior surface configuration and each includes a pillar-forming portion 480 and a longitudinally extending portion 482. Each pillar-forming portion 480 is connected to a respective main side rail structure 470 and extends upwardly therefrom to form a forward-most or "A" pillar thereon. The longitudinally extending portion 482 of each upper longitudinal member 476 is integrally connected at one end with an associated pillar-forming portion 480 and is connected at an opposite end 484 thereof (at a joint 485, of similar construction to joint 177 of FIG. 2) with an upper end of an associated rearward-most pillar 474. The longitudinally extending portion 482 of each hydroformed upper longitudinal member 476 thus defines a longitudinal length between the forward-most and rearward-most pillars on each side of the body module 464, which limits stacked tolerance as taught in application Ser. No. 09/173,554.

A plurality of laterally extending connecting structures, generally designated 486, are constructed and arranged to secure the main side rail structures 470, the upper longitudinal members 476 and the pillars 480, 474 in laterally spaced fixed relation. More specifically, the connecting structures 486 are connected between the pair of main side rail structures 470, between the upper longitudinal members 476, 478 and between the rearward-most pillars 474. The plurality of connecting structures 486 are constructed and arranged to secure the main side rail structures 470, the upper longitudinal members 476, 478 and the rearward-most pillars 474 in laterally spaced fixed relation.

Preferably the body module 464 of the space frame 460 also includes a pair of tubular hydroformed U-shaped first and second cross members 488, 490, each being defined by an outwardly deformed tubular metallic wall fixed in a predetermined irregular exterior surface configuration and each including a cross portion 492, 494, respectively, and a pair of leg portions 496, 498, respectively, extending integrally from junctures 500, 502, respectively, at opposite ends thereof. Each leg portion 496, 498 of each U-shaped cross member 488, 490 is connected at a free end thereof to a respective main side rail structure (at joints 504 and 506, respectively) and extends upwardly therefrom. Joints 504 and 506 are of similar construction to joints 75 and 77, respectively, of FIG. 1.

Each juncture 500, 502 of each U-shaped member 488, 490 is connected (at joints 483, 485, respectively) to the longitudinally extending portion 482 of the associated upper longitudinal member 476, 478. Joints 483 and 485 are of similar construction to joints 23 and 27 of FIG. 1. The leg portions 496, 498 of the first and second U-shaped cross members 488, 490, respectively, thereby form pairs of corresponding laterally spaced intermediate and rearward-most pillars 472, 474, respectively. The cross portions 492, 494 of each of the first and second U-shaped members 488, 490 extend laterally between the longitudinally extending portions 482 of the upper longitudinal members 476, 478 and between the pillars 488, 490, thereby providing laterally extending cross structure between and defining a lateral length between the corresponding intermediate pillars 472 and the rearward-most pillars 474, respectively, according to the principles of application Ser. No. 09/173,554.

The front module 466 includes a pair of front lower side rail structures 512, a pair of front upper side rail structures 514 and front connecting structure generally designated 516. The front connecting structure 516 is constructed and arranged to interconnect the front lower side rail structures 512 to one another in laterally spaced relation and the front upper side rail structures 514 to one another in laterally spaced relation.

The front connecting structure 516 includes a laterally extending forward upper cross structure 518 connected between the forward ends of the front upper side rail structures 514 (at butt welded joints 519), the cross structure 518 and the rail structures 514 thereby forming the bight portion and leg portions, respectively, of a front upper U-shaped structure 520. The front connecting structure 516 further includes a laterally extending forward lower cross structure 522 connected between the forward ends of the front lower side rail structures 512, the forward lower cross structure 522 and the lower side rails 512 thereby forming the bight portion and leg portions, respectively, of a front lower U-shaped structure 524. A pair of laterally spaced, vertically extending connecting structures 526 are each connected between the bight portion of the front upper U-shaped structure 520 and a bight portion of the lower front U-shaped structure 524. Preferably each cross structures 526 is a skeletonized stamped metal, structure and is secured between the upper and lower U-shaped structures 520, 524 by welding. A laterally extending connecting structure 530 is connected between the pair of leg portions of the front lower U-shaped structure (at welded joints 532).

The rear module 468 includes a pair of rearward lower side rail structures 534, a pair of rearward upper side rail structures 536 and rearward connecting structure, generally designated 538. The rearward connecting structure 538 is constructed and arranged to interconnect the rearward lower side rail structures 534 to one another in laterally spaced relation and the rearward upper side rail structures 536 to one another in laterally spaced relation.

Preferably, the laterally extending rearward connecting structure 538 includes (1) a lower U-shaped member 540 having a cross portion 542 and a pair of leg portions 544 extending from junctures 546 at opposite ends of the cross portion 542 and (2) a laterally extending elongated rearward connecting member 548 rigidly connected between free ends of the leg portions 544 of the lower U-shaped member 540 (at welded joints 543) to form a rearward ring assembly 549. The rearward ring assembly 549 is connected at welded joints 558 with rearward ends of the pair of laterally spaced rearward lower side rail structures 534 and with rearward ends of the pair of rearward upper side rail structures 536 at joints 560.

The front module 466 is rigidly fixed to the body module 464 by rigidly interconnecting each front upper side rail structure 514 to the pillar-forming portion 480 of a respective hydroformed upper longitudinal member 476, 478 (to form a pair of welded joints that are not shown but which are indicated by a dashed line in FIG. 4). Preferably, each upper longitudinal member is rigidly connected (by welding or other suitable means) to a forward-most end of the associated main lower side rail structure 470 as shown in FIG. 4. Alternatively, the pillar forming portion 480 of each upper longitudinal member 476 can be connected to the associated main lower side rail structure 470 in a manner similar to the connection between the pillar forming portion 168 of the upper longitudinal member 164 and the associated side rail member 412 shown in FIG. 3, for example, to form a joint between the members 476, 460 of the sedan space frame similar to joint 328 of the sports utility vehicle 302. It can be appreciated that in the former case (that is, when each upper longitudinal member 476, 478 is rigidly connected to a forward-most end of the associated main lower side rail structure 470 as shown in FIG. 4), each front lower side rail structure 512 is preferably connected with a lower end of the pillar-forming portion 480 of a respective upper longitudinal member 476, 478 (to form a pair of welded joints that are not shown but which are indicated by a dashed line in FIG. 4). It can also be appreciated that in the latter case, (when the joint between the upper longitudinal member 476 and the side rail structure 470 is similar to the joint 328 in FIG. 3), each front lower side rail structure 512 of the front module 466 is preferably connected to the forward-most end of the associated main lower side rail structure 470 of the body module 462.

The rear module 468 is rigidly fixed to the body module 464 by rigidly interconnecting each rearward lower side rail structure 534 with a respective main side rail structure 470 (to form a pair of welded joints that are not shown but which are indicated by a dashed line in FIG. 4) and each rearward upper side rail structure 536 to a respective rearward-most pillar (to form a pair of welded joints that are not shown but which are indicated by a dashed line in FIG. 4).

Preferably, the front upper side rail structures 514 are provided by a pair of tubular hydroformed front upper side rail members 570, 572 and the front lower side rail structures 512 are provided by a pair of tubular hydroformed front lower side rail members 574, 576. Preferably, the forward upper and lower cross structures 518, 522, respectively, are provided by tubular hydroformed members 578, 580, respectively. Preferably, the rearward lower side rail structures 534 are provided by tubular hydroformed members 550, 552 and the rearward upper side rail structures 536 are provided by tubular hydroformed members 554, 556. The hydroformed members 550, 552 are connected to the rearward ring assembly 549 at the joints 546 and the hydroformed members 554, 556 are connected to the rearward ring assembly 549 at joints 560.

The laterally extending cross structure 486 includes two laterally extending hydroformed essentially straight cross members 584, 586 mounted between the upper longitudinal members 476, 478. The pair of cross members 584, 586 are rigidly fixed by welding within hydroformed recesses 588, 590, respectively, formed in the upper longitudinal members 476, 478 to form joints 592, 594, respectively, of similar construction to joints 104 and 106 of FIG. 1.

Preferably the main side rail structures 470 are provided by a pair of individual hydroformed members 596, 598, each having an essentially straight portion 600 and an arcuate portion 602. The arcuate portions 602 of the members 596, 598 form forward halves of the rear wheel wells of the space frame 460. Arcuate forward portions 603 of the rearward lower side rail members 550, 552 form the rearward halves of the rear wheel wells. The main side rail members 596, 598 form welded joints 604 with the respective upper longitudinal members 476, 478.

Three laterally extending tubular hydroformed cross members 606, 608, 610 are mounted between the main side rail members 600, 602 of the body module 464. Specifically, the cross members 606, 608 are mounted between the first side rail members 600, 602 at welded joints 612 and 614, respectively. The cross member 610 is mounted between the side rail members 600, 602 at welded joints 616.

Hydroforming Method

Figure 5:
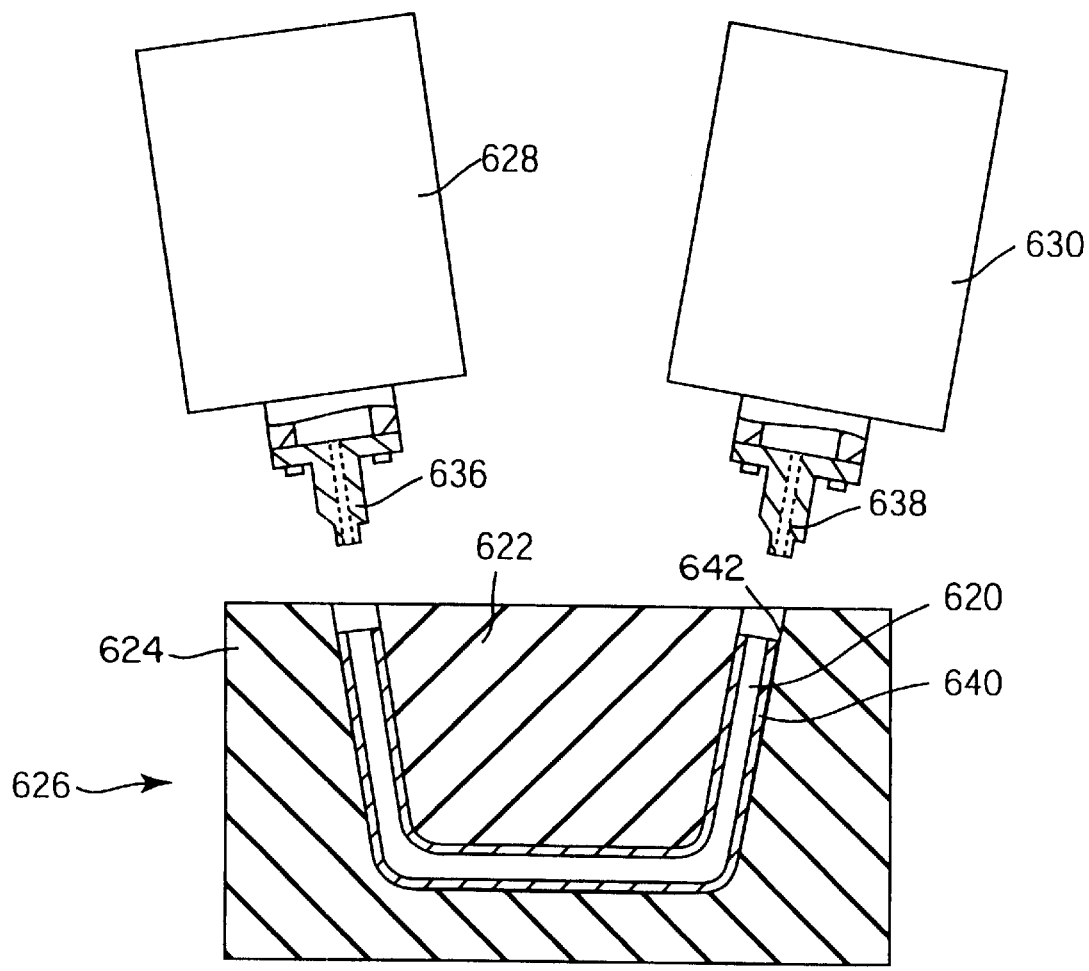
FIG. 5 is a schematic view of a hydroforming die assembly with a tubular blank therein.

The preferred hydroforming process for forming each hydroformed member of each of the exemplary space frames 10, 150, 300, 460 described above can be understood from FIG. 5. Each hydroformed member is formed from a tubular blank 620 constructed of a suitable metal material and has a closed transverse cross section and open tubular ends. Each blank 620 may be constructed by any suitable method. For example, the transverse cross section of each blank 620 may be shaped by roll forming a continuous longitudinally extending strip of sheet metal in a roll forming operation and the transverse cross section subsequently closed by a seam welding operation. Thus, preferably, each of the hydroformed tubular members of each exemplary space frame 10, 150, 300, 460, 710 has only a single longitudinally extending seam weld that is formed in creating the original tubular blank. This is distinct from more conventional tubular frame members, which comprise two C-shaped or "clam-shell" halves welded to one another in facing relation along two seams. The tubular blank is then cut to the length required to make a particular hydroformed member.

If required by the part geometry, it is within the scope of the invention to form a single tubular blank from two separately roll formed tubular blanks of different diameters which have been butt-welded to one another at a butt-welded connection. That is, if the diameter of a single hydroformed member increases (or decreases) greatly along its longitudinal length, the tubular blank used to make that hydroformed member can be constructed by butt welding two blanks of different diameter. The diameters of the two ends to be butt-welded can be equalized either by using a reduction tool to reduce the diameter of one end of the larger diameter tubular blank or, alternately, by using a flaring or expansion tool to expand the diameter of an end portion of the smaller diameter blank, or a combination of both.

The result of either operation is to equalize the diameters of the two ends to be butt-welded together. The butt-welded connection is formed prior to the hydroforming operation, but the butt-welding operation can be performed either before or after any pre-bending operations (considered immediately below) are performed. An example of a hydroformed member having a butt weld connection is the upper longitudinal member 30 in the space frame 10 in FIG. 1 which includes a butt weld 90.

The blank may optionally be "pre-bent", that is, bent prior to being placed in a hydroforming die assembly, if the geometry of the part is complex or if there are to be any sharp bends in the finished member. For example, if there is to be a sharp bend (a bend of greater than 30°) in the hydroformed member, preferably the present invention bends the blank according the teachings of Ser. No. 09/299, 595, filed Oct. 7, 1997, entitled METHOD AND APPARATUS FOR WRINKLE-FREE HYDROFORMING OF ANGLED TUBULAR PARTS, hereby incorporated by reference in its entirety. The teachings of Ser. No. 09/299,595 can be used to avoid wrinkle formation during the bending operation, particularly on the concave portion of each bend in a hydroformed part. Examples of sharp bends in the individual hydroformed parts of the space frame 10 (FIG. 1) include the bend between each leg portion 72 and the cross portion 68 of the first U-shaped member 64.

It should be understood that the methodology of Ser. No. 60/061,238 would preferably not be used for parts that are bent at an angle of less than 30°. Preferably, straight parts (such as cross member 94 in FIG. 1, for example) are hydroformed in accordance with the teachings of Ser. No. 08/915,910, filed Aug. 21, 1997, entitled Hydroforming Die Assembly For Pinch-Free Tube Forming, hereby incorporated by reference in its entirety. A blank may also be bent in a CNC bending machine prior to being placed in the die assembly. A suitable lubricant may be applied to the exterior of the blank prior to placing it in the die assembly.

With reference again to FIG. 5, the tubular blank 620 is then placed between the die halves 622, 624 of the die assembly 626 and the assembly is closed. The tubular blank 620 is preferably immersed in a fluid bath so that it is filled with hydroforming fluid. A hydroforming ram assembly 628, 630 is engaged with each end of the tubular blank 620 such that a ram member 636, 638 of each assembly 628, 630 seals an end of a tubular blank 620. The ram members 636, 638 include hydraulic intensifiers which can intensify the hydroforming fluid, thereby increasing the fluid pressure of the fluid within the blank 620 to irregularly outwardly deformed tubular metallic wall, generally designated 640, of the tubular blank 620 into conformity with the die surfaces 642 of the die cavity (as disclosed in Ser. No. 60/061,238) to thereby form a hydroformed member having an exterior surface that is fixed into a predetermined irregular configuration.

The ram members 636, 638 push axially inwardly on opposite ends of the blank 620 to create metal flow within the blank during outward expansion. The fluid pressure and the axial pressure are independently controllable. Preferably, the ends of the tubular blank 620 are pushed axially inwardly during the hydroforming operation to maintain the wall thickness of the fully formed hydroformed member within a predetermined range of the wall thickness of the initial tubular blank 620. This process is discussed in detail in the aforesaid application Ser. No. 60/061,238. Preferably the ram members 636, 638 cooperate to replenish or maintain the wall thickness of the outwardly expanding wall portions of the blank 620 so that the wall thickness of the resulting hydroformed member is within about +/−10% of the original wall thickness of the blank 620, (i.e., to compensate for wall thinning during diametric outward expansion of the tube).

The tubular blank 620 expands into conformity with the surfaces 642 defining the hydroforming die cavity so as to irregularly outwardly expand the metallic wall 640 of the blank 620 into conformity with the surfaces 620 of the die assembly 626 to provide the metallic wall 640 with a shape corresponding to the desired shape for the member. The shape of each die cavity used to form each hydroformed member of each space frame 10, 150, 300, 460 in accordance with the present invention is particularly adapted to the shape of the new and advantageous hydroformed tubular members contemplated herein.

If holes are to be formed in a hydroformed member, the holes may be formed whole the member is still in the die assembly during the hydroforming operation or may be formed after the hydroformed member is removed from the die assembly along with any other required further processing of the member. More particularly, holes may be formed during the hydroforming process in what is known in the art as a hydropiercing operation. A hydropiercing operation is disclosed in U.S. Pat. No. 5,460,026 which is hereby incorporated by reference in its entirety into the present application. Alternatively, holes or notches may be cut in a hydroformed member after the hydroforming operation is completed. Recesses (such as recesses 102, 104 in FIG. 1) can be formed in the walls hydroformed members during outward expansion of the metallic wall of the blank by using a net pad.

It can be appreciated that the transverse cross section of many of the hydroformed members varies along the length of the particular hydroformed member. For example, the transverse cross sections of the leg portions 72 and the cross portion 68 of the tubular hydroformed cross member 64 (FIG. 1) vary long the longitudinal length thereof. The cross portion 68 has a relatively small, substantially rectangular cross-section and the leg portions 72 have relatively large substantially rectangular cross-section near the free ends thereof and an irregular transverse cross section in the middle portions thereof. It can be understood that altering the cross-sectional configuration of this tubular hydroformed member or of any other tubular hydroformed member disclosed herein can be accomplished without departing from the principles of the present invention. It can thus be understood that each hydroformed member used to construct each of the space frames above 10, 150, 300, 460 is generally of tubular construction.

Method of Forming a Space Frame

It can thus be understood that a preferred method of forming a space frame 10, 150, 300 for a motor vehicle includes forming each of a pair of upper longitudinal members 30, 164, 320 in a hydroforming procedure, each procedure including providing an angularly shaped tubular blank 620 having a metallic wall 640, placing the blank 620 into a die assembly 626 having die surfaces 642 defining a die cavity and providing pressurized fluid in an interior of the blank 620 to expand the wall 640 into conformity with the die surfaces 642, thereby forming a hydroformed member 30, 164, 320 defined by an irregularly outwardly deformed tubular metallic wall 640 fixed into a predetermined irregular exterior surface configuration and including a pillar-forming portion 34, 168, 324 and a longitudinally extending portion of 36, 170, 326. The method further includes providing components for a space frame comprising a body module 12, 152, 310 and a front module 22, 162, 312. The body module components include a pair of main side rail structures 14, 154, 304, a pair of rearward-most upright structures 26, 162, 318 and a plurality of connecting structures 40, 180, 336. The front module components include a pair of front lower side rail structures, a pair of front upper side rail structures 42, 202, 390 and front connecting structure 44, 204, 392.

The method next requires assembling the modules so that in the body module the pillar-forming portion of each upper longitudinal member is connected to respective main side rail structure thereby forming a pair of A pillars, each rearward-most upright structure is connected between a respective main side rail structure and an end of the longitudinally extending portion of an associated upper longitudinal member to form a pair of rearward-most pillars (i.e., the D pillars), and the plurality of connecting structures are constructed and arranged to connect the main side rail structures and the upper longitudinal members in laterally spaced fixed relation; and so that in the front module, the front connecting structure connects the front upper side rail structures to one another in laterally spaced relation and the front lower side rail structures to one another in laterally spaced relation. The method next requires assembling the forward module to the body module to form a space frame by connecting the body module and the front module. The body module and front module are connected by connecting each main side rail structure with a respective front lower side rail structure and each front upper side rail structure to the pillar-forming portion of a respective upper longitudinal member at a position spaced upwardly from the associated main side rail structure.

Preferably the method further includes providing the body module with a pair of intermediate pillars and a cross structure connected therebetween by forming a cross member 64, 182, 340 in a hydroforming procedure. A preferred hydroforming procedure is accomplished by providing a U-shaped tubular blank 620 having a metallic wall, placing the blank into a hydroforming die assembly 626 having die surfaces 642 defining a die cavity therein and providing pressurized fluid into an interior of the blank so as to expand the wall into conformity with the die surfaces of the die cavity of the die assembly, thereby forming a U-shaped hydroformed member defined by a regularly (i.e., uniformly) or irregularly outwardly deformed tubular metallic wall 640 fixed into a predetermined irregular exterior surface configuration and having a cross portion 68, 186, 344 and a pair of leg portions 72, 190, 340 extending from junctures 76, 194, 352 at opposite ends of the cross portion. The assembling procedure further includes assembling the space frame so that each of the leg portions of the U-shaped hydroformed cross member is connected between a respective main side rail structure and the longitudinally extending portion of the associated upper longitudinal member such that the leg portions form a pair of corresponding intermediate pillars which provide the B pillars of the space frame and the cross portion defines a lateral length between and provides a cross structure connected between the leg portions.

A preferred method of forming a space frame 460 for sedan-type motor vehicle includes forming each of a pair of upper longitudinal members 476 in a hydroforming procedure. Each hydroforming procedure includes providing an angularly shaped tubular blank 620 having a metallic wall 640, placing the blank 620 into a hydroforming die assembly 626 having die surfaces 642 defining a die cavity and providing pressurized fluid in an interior of the blank 620 to expand the wall 640 into conformity with the die surfaces, thereby forming a member 476 defined by an irregularly outwardly deformed tubular metallic wall 640 fixed into a predetermined irregular exterior surface configuration and including a pillar-forming portion 480 and a longitudinally extending portion 482. The method next includes providing components for a space frame 460 comprising a body module 464, a front module 466 and a rearward module 468. The body module includes a pair of main side rail structures 470, a pair of rearward-most upright structures 474 and a plurality of connecting structures 486. The front module includes a pair of front lower side rail structures 512, a pair of front upper side rail structures 520 and front connecting structure 516. The rearward module includes a pair of rearward lower side rail structures 534, a pair of rearward upper side rail structures 536 and rearward connecting structure 538. The method next includes assembling the modules so that in the body module 464, the pillar-forming portion 480 of each upper longitudinal member 476, 478 is connected to a respective main side rail structure 470 thereby forming a pair of A pillars, each rearward-most upright structure 474 is connected between a respective main side rail structure 470 and an end portion of the longitudinally extending portion 482 of an associated upper longitudinal member 476, thereby forming a pair of rearward-most pillars (that is, the C pillars), and the plurality of connecting structures 486 are constructed and arranged to secure the main side rail structures and the upper longitudinal members in laterally spaced fixed relation. The front module 466 is assembled according to the method so that the front connecting structure 516 connects the front upper side rail structures 520 to one another in laterally spaced relation and the forward lower side rail structures 512 to one another in laterally spaced relation. The rearward module 468 is assembled according to the method so that the rearward connecting structure 538 connects the rearward lower side rail structures 534 to one another in laterally spaced relation and the rearward upper side rail structures 536 to one another in laterally spaced relation.

The method next connects the modules 464, 466, 468 together to form a space frame 460 by rigidly interconnecting each, each front upper side rail structure 520 to a respective pillar-forming portion 480, each main side rail structure 470 with a respective rearward lower side rail structure 534 and each rearward upper side rail structure 536 to a respective rearward-most pillar 474.

Preferably the method recited immediately above for assembling a space frame for a sedan-type vehicle further includes providing the body module 464 with a pair of intermediate pillars 472 and a cross structure 472 connected therebetween by forming a cross member 488 in a hydroforming procedure. A preferred hydroforming procedure is accomplished by providing a U-shaped tubular metallic blank 620 having a metallic wall, placing the blank into a hydroforming die assembly 626 having die surfaces 642 defining a die cavity therein and providing pressurized fluid into an interior of the blank 620 to expand the wall into conformity with the die surfaces, thereby forming a U-shaped member 488 defined by an irregularly outwardly deformed tubular metallic wall fixed into a predetermined irregular exterior surface configuration and having a cross portion 492 and a pair of leg portions 496 extending from junctures 500 at opposite ends of the cross portion. The assembling procedure further includes assembling the space frame 460 so that each of the leg portions 496 is connected between a main side rail structure 470 and the longitudinally extending portion 482 of the associated upper longitudinal member 476, 478 so that the leg portions form a pair of intermediate pillars 472 which define B pillars of the body module 464 and the cross portion 492 defines a lateral length and provides a cross structure connected therebetween.

It should be pointed out that although various portions of the space frames 10, 150, 300, 460 are referred to as "modular", this characterization is intended to be broadly construed and is not intended to limit the manner in which any of the space frames are constructed. It is preferred that the body module and front module (and the rearward module of the space frame 460) of each space frame be assembled separately and then assembled together to form the respective space frames. It is contemplated to construct each space frame 10, 150, 300 and 460 in a variety of ways, however, and so it is to be understood that no limitations on the order in which the various hydroformed members and other structural members are joined together to form each space frame is to be implied by anything shown or stated in the present application.

Thus, it can be appreciated that although the space frames in FIGS. 1, 3 and 4 show portions or "modules" thereof in exploded view, it is understood that while it is contemplated and preferred to completely assemble each module separately before the modules are connected together to form each space frame, this is not required by the invention and the invention is therefore not limited to this method of constructing each space frame 10, 150, 300, 460.

It can be understood that the modular approach allows a particular module to be used in the construction of a wide range of space frames. For example, the body module 462 of the space frame 460 shown in FIG. 4 generally defines the passenger compartment portion of the vehicle. Several different forward and rearward modules can be constructed for use on a body module having a particular construction to provide space frames having different configurations and/or different lengths. A range of front modules can be easily constructed, for example, to accommodate a wide range of vehicle front configurations similarly, the rear module can be reconfigured to provide different space frame lengths (and thus different vehicle lengths) and a variety of vehicle body styles and appearances. It can also be understood that the body module can be reconfigured and yet still be able to be interconnected with preexisting front and/or rear modules. It can also be understood that several exemplary front modules have been shown in the figures and that each front module was described in connection with a particular body module. One skilled in the art will understand, however, that each front module shown in the figures can easily be reconfigured for mounting on any of the body modules of the present invention.

Thus, while the invention has been disclosed and described with reference with a limited number of embodiments, it will be apparent that variations and modifications may be made thereto without departure from the spirit and scope of the invention. Therefore, the following claims are intended to cover all such modifications, variations, and equivalents thereof in accordance with the principles and advantages noted herein.

What is claimed is:

1. A space frame for constructing a motor vehicle, comprising:

a body module and a front module;

said body module comprising (a) a pair of laterally spaced longitudinally extending main side rail structures, (b) a pair of rearward upright structures each being connected to a respective main side rail structure and extending upwardly therefrom to form a pair of rearward-most pillars thereon (c) a pair of hydroformed upper longitudinal members each being defined by an outwardly deformed tubular metallic wall fixed in a predetermined irregular exterior surface configuration and each including a pillar-forming portion and a longitudinally extending portion, each pillar-forming portion being connected to a respective main side rail structure and extending upwardly therefrom to form an A pillar and each longitudinally extending portion being connected at an opposite end portion thereof with an associated one of said rearward-most pillars, thereby defining a longitudinal length between the associated A and rearward-most pillars; and (d) a plurality of connecting structures constructed and arranged to dispose the main side rail structures, the upper longitudinal members, and the pairs of pillars in laterally spaced fixed relation;

the front module comprising (a) a pair of front lower side rail structures, (b) a pair of front upper side rail structures and (c) front connecting structure constructed and arranged to connect (i) the front lower side rail structures to one another in laterally spaced relation and (ii) the front upper side rail structures to one another in laterally spaced relation;

said front module being rigidly fixed to said body module by rigidly interconnecting (1) each front lower side rail structure with a respective main side rail structure and (2) each front upper side rail structure to the associated A pillar of a respective hydroformed upper longitudinal member at a position spaced upwardly from the associated main side rail structure.

2. A space frame as defined in claim 1 further comprising at least one pair of intermediate upright structures each being connected between a respective main side rail structure and the longitudinally extending portion of an associated upper longitudinal member thereby forming a pair of intermediate pillars and wherein said plurality of laterally extending connecting structures are further constructed and arranged to connect each of said pair of intermediate pillars to one another in laterally spaced relation.

3. A space frame as defined in claim 2 wherein each upper longitudinal member further includes a second hydroformed pillar-forming portion extending integrally downwardly from the opposite end of the longitudinally extending portion thereof and forming a joint with the associated main side rail structure so that each upper longitudinal member has a generally inverted U-shaped configuration and so that each second pillar-forming portion forms the rearward-most pillar on each main side rail structure and wherein each main side rail structure extends rearwardly beyond the second pillar-forming portion of the associated upper longitudinal member so that the rearward portion of each main side rail structure defines a lower side rail of a bed portion of a pickup-type truck, and wherein the space frame further includes (1) a bed cross structure extending laterally between free ends of the bed forming portions of the main side rail structures, (2) a pair of bed upright structures each extending upwardly from respective ends of the bed cross structure and (3) a pair of longitudinally extending bed upper side rail structures each being connected between a bed upright structure and an intermediate portion of the second pillar-forming portion of the associated upper longitudinal member.

4. A space frame as defined in claim 3 further comprising a pair of tubular hydroformed U-shaped cross members, each being defined by an outwardly deformed tubular metallic wall fixed in a predetermined irregular exterior surface configuration and each U-shaped cross member including a cross portion and a pair of leg portions extending integrally from junctures at opposite ends thereof, each leg portion of each U-shaped cross member being connected at a free end thereof to a respective main side rail structure and extending upwardly therefrom and each juncture of each U-shaped member being connected to the longitudinally extending portion of the associated upper longitudinal member, the leg portions of the first and second U-shaped cross members thereby forming first and second pairs of said corresponding laterally spaced intermediate pillars, the cross portions thereof extending laterally between the associated pairs of intermediate pillars thereby defining a lateral length between said corresponding intermediate pillars, the first and second U-shaped cross members being longitudinally spaced so that the pairs of leg portions thereof form the B pillars and C pillars, respectively, of the body module.

5. A space frame as defined in claim 4 wherein the front connecting structure includes (1) a laterally extending forward upper cross structure connected between the forward ends of the front upper side rail structures, the forward upper cross structure and the front upper side rail structures thereby forming the bight portion and leg portions respectively of a front upper U-shaped structure, (2) a laterally extending forward lower cross structure connected between the forward ends of the front lower side rail structures, the forward lower cross structure and the front lower side rail structures thereby forming the bight portions and leg portions respectively of a front lower U-shaped structure, (3) a pair of laterally spaced vertically extending connecting structures each being connected generally between the bight portions of the front upper U-shaped structure and the lower front U-shaped structure and (4) a laterally extending connecting structure connected between the pair of leg portions of the front lower U-shaped structure.

6. A space frame as defined in claim 2 further including a rearward ring assembly comprising a tubular hydroformed lower U-shaped member and a tubular hydroformed inverted upper U-shaped member, the U-shaped members each being defined by an outwardly deformed tubular metallic wall fixed in a predetermined, irregular exterior surface configuration and each having a cross portion and integral leg portions extending from junctures at opposite ends thereof, the ring assembly being formed by fixedly interconnecting end portions of the leg portions of the upper U-shaped member with respective end portions of the leg portions of the lower U-shaped member, the junctures of the upper U-shaped member being connected with respective opposite ends of the longitudinally extending portions of the upper longitudinal members and the lower U-shaped member being connected across respective rearward ends of the main side rail structures such that the connected leg portions provide said rearward-most pillars, and the cross portions of the upper and lower U-shaped members providing laterally extending cross structures of said plurality of cross structures between said rearward-most pillars.

7. A space frame as defined in claim 6, further comprising a pair of tubular hydroformed U-shaped cross members, each being defined by an outwardly deformed tubular metallic wall fixed in a predetermined irregular exterior surface configuration and each U-shaped cross member including a cross portion and a pair of leg portions extending integrally from junctures at opposite ends thereof, each leg portion of each U-shaped cross member being connected at a free end thereof to a respective main side rail structure and extending upwardly therefrom and each juncture of each U-shaped member being connected to the longitudinally extending portion of the associated upper longitudinal member, the leg portions of the first and second U-shaped cross members thereby forming first and second pairs of said intermediate pillars, the cross portions thereof extending laterally between the associated pairs of intermediate pillars structures, thereby providing laterally extending cross structure and defining a lateral length between said pairs of intermediate pillars, the first and second U-shaped cross members being longitudinally spaced so that the pairs of leg portions thereof define B pillars and C pillars, respectively, of the body module.

8. A space frame as defined in claim 7 wherein the front connecting structure includes (1) a laterally extending front U-shaped cross structure having a cross portion and a pair of leg portions extending from junctures at opposite ends of the cross portion, the forward end of each front lower side rail structure being connected with an associated juncture and the forward end of each front upper side rail structure being connected with a free end of an associated leg portion of the front U-shaped cross structure, (2) a laterally extending elongated front connecting structure connected between the leg portions of the front U-shaped cross structure and (3) a laterally extending connecting structure connected between the front lower side rail structures.

9. A space frame as defined in claim 1 further including a rearward ring assembly comprising a tubular hydroformed lower U-shaped member and a tubular hydroformed inverted upper U-shaped member, the U-shaped members each being defined by an outwardly deformed tubular metallic wall fixed in a predetermined, irregular exterior surface configuration and each having a cross portion and integral leg portions extending from junctures at opposite ends thereof, the ring assembly being formed by fixedly interconnecting end portions of the leg portions of the upper U-shaped member with respective end portions of the leg portions of the lower U-shaped member, the rearward ring assembly being connected such that the opposite ends of the longitudinally extending portions of the upper longitudinal members are connected with respective junctures of the upper U-shaped member and rearward ends of the main side rail structures are connected with the cross portion of the lower U-shaped member so that (1) the interconnected leg portions provide said rearward-most pillars and (2) the cross portions of the upper and lower U-shaped members provide laterally extending cross structures of said plurality of cross structures between said rearward-most pillars, the body module further comprising a pair of secondary side rail structures each connected between an intermediate portion of the main side rail structure and an intermediate portion of the associated rearward-most pillar formed by the rearward ring assembly.

10. A space frame as defined in claim 9, further comprising a pair of tubular hydroformed U-shaped cross members, each being defined by an outwardly deformed tubular metallic wall fixed in a predetermined irregular exterior surface configuration and each U-shaped cross member including a cross portion and a pair of leg portions extending integrally from junctures at opposite ends thereof, each leg portion of the first U-shaped cross member being connected at a free end thereof to a respective main side rail structure and extending upwardly therefrom and each juncture thereof being connected to the longitudinally extending portion of the associated upper longitudinal member, the leg portions of the first U-shaped cross member thereby forming a first pair of intermediate pillars constituting a pair of B pillars of the body module and the cross portion thereof extending laterally between the first pair of intermediate pillars, thereby providing a laterally extending cross structure between and defining a lateral length between the first pair of intermediate pillars, each leg portion of the second U-shaped cross member being connected at a free end thereof to a respective secondary lower side rail structure and extending upwardly therefrom and each juncture thereof being connected to the longitudinally extending portion of the associated upper longitudinal member, the leg portions of the second U-shaped cross member thereby forming a second pair of intermediate pillars constituting a pair of C pillars of the body module and the cross portion thereof extending laterally between the second pair of intermediate pillars, thereby providing laterally extending cross structure between and defining a lateral length between the second pair of intermediate pillars.

11. A space frame as defined in claim 10 wherein the front connecting structure includes (1) a laterally extending forward upper cross structure connected between the forward ends of the front upper side rail structures, the forward upper cross structure and the front upper side rail structures thereby forming the bight portion and leg portions respectively of a front upper U-shaped structure, (2) a laterally extending front U-shaped cross structure having a cross portion and a pair of leg portions extending from junctures at opposite ends of the cross portion, each juncture being connected with the forward end of an associated front lower side rail structure and each leg portion being connected with the forward upper cross structure of the front upper U-shaped structure and (3) a laterally extending connecting structure connected between the front lower side rail structures.

12. A space frame for constructing a motor vehicle, comprising:

a body module, a front module and a rearward module;

the body module comprising (a) a pair of main side rail structures, (b) a pair of rearward-most upright structures each connected to a respective main side rail structure and defining a rearward-most pillar thereon, (c) a pair of hydroformed upper longitudinal members each defined by an outwardly deformed tubular metallic wall fixed in a predetermined irregular exterior surface configuration and each having a pillar-forming portion connected to a respective main side rail structure to form a forward-most pillar thereon and a longitudinally extending portion connected at a free end thereof with an associated rearward-most pillar thereby defining a longitudinal length between the associated forward-most and rearward-most pillars and (d) a plurality of connecting structures constructed and arranged to secure the main side rail structures, the upper longitudinal members and the pillars in laterally spaced fixed relation, the front module comprising (a) a pair of front lower side rail structures, (b) a pair of front upper side rail structures and (c) front connecting structure constructed and arranged to interconnect (i) the front lower side rail structures to one another in laterally spaced relation and (ii) the front upper side rail structures to one another in laterally spaced relation, and the rearward module comprising (a) a pair of rearward lower side rail structures, (b) a pair of rearward upper side rail structures and (c) rearward connecting structure constructed and arranged to interconnect (i) the rearward lower side rail structures to one another in laterally spaced relation and (ii) the rearward upper side rail structures to one another in laterally spaced relation;

said front module being rigidly fixed to said body module by rigidly interconnecting each front upper side rail structure to the pillar-forming portion of a respective hydroformed upper longitudinal member; and said rearward module being rigidly fixed to said body module by rigidly interconnecting (1) each rearward lower side rail structure with a respective main side rail structure and (2) each rearward upper side rail structure to a respective rearward-most pillar.

13. A space frame as defined in claim 12 further comprising a pair of tubular hydroformed U-shaped cross members, each being defined by an outwardly deformed tubular metallic wall fixed in a predetermined irregular exterior surface configuration and each including a cross portion and a pair of leg portions extending integrally from junctures at opposite ends thereof, each leg portion of each U-shaped cross member being connected at a free end thereof to a respective main side rail structure and extending upwardly therefrom and each juncture of each U-shaped member being connected to the longitudinally extending portion of the associated upper longitudinal member, the leg portions of the first U-shaped cross member thereby forming a pair of intermediate pillars and the leg portions of the second U-shaped cross member thereby forming said pair of rearward-most pillars, the cross portions thereof extending laterally between the respective pairs of pillars thereby providing laterally extending cross structure therebetween and defining a lateral length between the associated intermediate and rearward-most pillars.

14. A space frame as defined in claim 13 wherein the front connecting structure includes (1) a laterally extending forward upper cross structure connected between the forward ends of the front upper side rail structures, thereby forming the bight portion and leg portions respectively of a front upper U-shaped structure, (2) a laterally extending forward lower cross structure connected between the forward ends of the front lower side rail structures, thereby forming the bight portions and leg portions respectively of a front lower U-shaped structure, (3) a pair of laterally spaced vertically extending connecting structures each being connected between the bight portion of the front upper U-shaped structure and the bight portion of the lower front U-shaped structure and (4) a laterally extending connecting structure connected between the pair of legs of the front lower U-shaped structure.

15. A space frame as defined in claim 14 wherein the laterally extending rearward connecting structure includes (1) a lower U-shaped member having a cross portion and a pair of leg portions extending from junctures at opposite ends of the cross portion and (2) an laterally extending elongated rearward connecting member rigidly connected between free ends of the leg portions of the lower U-shaped member to form a rearward ring assembly, the rearward ring assembly being connected at joints with rearward ends of the pair of rearward lower side rail structures and with rearward ends of the pair of rearward upper side rail structures.

16. A method of forming a space frame for a motor vehicle, comprising:

forming each of a pair of upper longitudinal members in a hydroforming procedure;

providing components for a space frame comprising a body module and a front module, the body module components including (a) a pair of main side rail structures, (b) a pair of rearward upright structures and (c) a plurality of connecting structures, and the front module components including (a) a pair of front lower side rail structures (b) a pair of front upper side rail structures and (c) front connecting structure;

assembling said modules so that in the body module (a) the pillar-forming portion of each upper longitudinal member is connected to respective main side rail structure thereby forming a pair of A pillars, (b) each rearward upright structure is connected between a respective main side rail structure and an end of the longitudinally extending portion of an associated upper longitudinal member to form a pair of rearward-most pillars (c) the plurality of connecting structures are constructed and arranged to secure the main side rail structures and the upper longitudinal members in laterally spaced fixed relation, and so that in the front module the front connecting structure connects (i) the front upper side rail structures to one another in laterally spaced relation and (ii) the front lower side rail structures to one another in laterally spaced relation; and connecting said body module and said front module by connecting (1) each main side rail structure with a respective front lower side rail structure and (2) each front upper side rail structure to the pillar-forming portion of a respective upper longitudinal member at a position spaced upwardly from the associated main side rail structure.

17. A method of forming a space frame for a motor vehicle as defined in claim 16 further comprising providing on the body module a pair of intermediate pillars and a cross structure connected therebetween by forming a cross member formed in a hydroforming procedure, said procedure including providing a U-shaped tubular metallic blank, placing the blank into a hydroforming die assembly having die surfaces defining a die cavity therein, providing pressurized fluid into an interior of the blank to expand the blank into conformity with said die surfaces thereby forming a U-shaped hydroformed member defined by an irregularly outwardly deformed tubular metallic wall fixed into a predetermined irregular exterior surface configuration and having a cross portion and a pair of leg portions extending from junctures at opposite ends of said the cross portion and by further assembling said body module so that each of said leg portions of said U-shaped hydroformed cross member is connected between a respective main side rail structure and the longitudinally extending portion of the associated upper longitudinal member such that said leg portions form said pair of intermediate pillars which provide the B pillars of the body module and said cross portion defines a lateral length between and provides a cross structure connected between the leg portions.

18. A method of forming a space frame for a motor vehicle, comprising:

forming each of a pair of upper longitudinal members in a hydroforming procedure;

providing components for a space frame comprising a body module, a front module and a rearward module, the body module including (a) a pair of main side rail structures, (b) a pair of rearward-most upright structures and (c) a plurality of connecting structures, the front module including (a) a pair of front lower side rail structures; (b) a pair of front upper side rail structures and (c) front connecting structure and the rearward module comprising (a) a pair of rearward lower side rail structures, (b) a pair of rearward upper side rail structures and (c) rearward connecting structure;

assembling said modules so that in the body module (a) the pillar-forming portion of each upper longitudinal member is connected to a respective main side rail structure thereby forming a pair of A pillars, (b) each rearward-most upright structure is connected between a respective main side rail structure and an end portion of the longitudinally extending portion of an associated upper longitudinal member thereby forming a pair of rearward-most pillars, (c) said plurality of connecting structures are constructed and arranged to secure the main side rail structures and the upper longitudinal members in laterally spaced fixed relation, so that in the front module the front connecting structure connects (i) the front upper side rail structures to one another in laterally spaced relation and (ii) the front lower side rail structures to one another in laterally spaced relation and so that in the rearward module the rearward connecting structure connects (i) the rearward upper side rail structures to one another in laterally spaced relation and (ii) the rearward lower side rail structures to one another in laterally spaced relation; and connecting said modules by (a) rigidly interconnecting each front upper side rail structure to the pillar-forming portion of a respective upper longitudinal member, each rearward lower side rail structure with a respective main side rail structure and each rearward upper side rail structure to a respective rearward-most pillar.

19. A method of forming a space frame for a motor vehicle as defined in claim 18 further comprising providing on the body module a pair of intermediate pillars and a cross structure connected therebetween by forming a cross member in a hydroforming procedure, said hydroforming procedure including providing a U-shaped tubular metallic blank having a metallic wall, placing the blank into a hydroforming die assembly having die surfaces defining a die cavity therein, and providing pressurized fluid into an interior of said wall to expand said blank into conformity with said die surfaces thereby forming a U-shaped member defined by an irregularly outwardly deformed tubular metallic wall fixed into a predetermined irregular exterior surface configuration and having a cross portion and a pair of leg portions extending from junctures at opposite ends of said cross portion;

and by further assembling said body module so that each of said leg portions is connected between a main side rail structure and the longitudinally extending portion of the associated upper longitudinal member such that the leg portions form a pair of intermediate pillars which define B pillars of the body module and said cross portion defines a lateral length and provides a cross structure connected therebetween.

\* \* \* \* \*

UNITED STATES PATENT AND TRADEMARK OFFICE
CERTIFICATE OF CORRECTION

PATENT NO.    : 6,533,348 B1
DATED         : March 18, 2003
INVENTOR(S)   : Jaekel et al.

It is certified that error appears in the above-identified patent and that said Letters Patent is hereby corrected as shown below:

<u>Title page,</u>
Item [22] Filed:, please change "Sep. 7, 2000" to -- April 24, 2000 --.

Signed and Sealed this

Twenty-third Day of September, 2003

JAMES E. ROGAN
*Director of the United States Patent and Trademark Office*